(12) United States Patent
Nozue et al.

(10) Patent No.: US 8,299,194 B2
(45) Date of Patent: Oct. 30, 2012

(54) ETHYLENE-α-OLEFIN COPOLYMER AND ARTICLE

(75) Inventors: Yoshinobu Nozue, Ichihara (JP); Naoko Ochi, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/320,866

(22) PCT Filed: May 27, 2010

(86) PCT No.: PCT/JP2010/059407
§ 371 (c)(1),
(2), (4) Date: Nov. 16, 2011

(87) PCT Pub. No.: WO2010/137740
PCT Pub. Date: Dec. 2, 2010

(65) Prior Publication Data
US 2012/0065352 A1    Mar. 15, 2012

(30) Foreign Application Priority Data
May 29, 2009 (JP) ................................. 2009-130156

(51) Int. Cl.
*C08F 210/08* (2006.01)
(52) U.S. Cl. ..................................... 526/348.6; 526/352
(58) Field of Classification Search .................. 526/348, 526/348.6, 352
See application file for complete search history.

(56) References Cited

U.S. PATENT DOCUMENTS

| | | | |
|---|---|---|---|
| 5,374,700 A | 12/1994 | Tsutsui et al. | |
| 5,798,427 A | 8/1998 | Foster et al. | |
| 5,883,205 A | 3/1999 | Tsutsui et al. | |
| 2010/0029868 A1 | 2/2010 | Kawashima et al. | |
| 2010/0305292 A1 | 12/2010 | Nozue et al. | |
| 2010/0310799 A1* | 12/2010 | Nozue et al. | 428/35.7 |
| 2011/0040059 A1 | 2/2011 | Nozue et al. | |

FOREIGN PATENT DOCUMENTS

| | | |
|---|---|---|
| JP | 4-213309 A | 8/1992 |
| JP | 8-311260 A | 11/1996 |
| JP | 2005-097481 A | 4/2005 |
| JP | 2005-281676 A | 10/2005 |
| JP | 2006-274161 A | 10/2006 |
| JP | 2006-321991 A | 11/2006 |
| JP | 2008-239954 A | 10/2008 |
| JP | 2008-248088 A | 10/2008 |
| JP | 2009-173896 A | 8/2009 |

* cited by examiner

*Primary Examiner* — Robert D. Harlan
(74) *Attorney, Agent, or Firm* — Sughrue Mion, PLLC

(57) ABSTRACT

An ethylene-α-olefin copolymer comprising monomer units derived from ethylene and monomer units derived from an α-olefin having 3 to 20 carbon atoms, having a density (d) of 860 to 950 kg/m$^3$, having a melt flow rate (MFR) of 0.05 to 100 g/10 min, having a ratio (Mw/Mn) of the weight average molecular weight (Mw) thereof to the number average molecular weight (Mn) thereof of 2 to 10, having a swell ratio (SR) of less than 1.35, and having a g* of 0.50 to 0.75.

2 Claims, No Drawings

# ETHYLENE-α-OLEFIN COPOLYMER AND ARTICLE

TECHNICAL FIELD

The present invention relates to an ethylene-α-olefin copolymer and an article obtained by extruding the ethylene-α-olefin copolymer.

BACKGROUND ART

An article obtained by extruding an ethylene-α-olefin copolymer is used frequently in films, sheets, containers etc. used for packaging foods, medicaments, daily goods, etc. A variety of ethylene-α-olefin copolymers are known and, for example, Patent Literature 1 describes an ethylene-1-butene copolymer in which a melt tension and a melt flow rate satisfy a particular relation, and a temperature of a maximum peak in an endothermic curve measured by a differential scanning calorimeter, and a density satisfy a particular relation, as an ethylene-α-olefin copolymer which is superior in a melt tension and has a narrow composition distribution. Patent Literature 2 describes an ethylene-1-hexene copolymer in which an activating energy of flow is 50 kJ/mol or more, a melt flow rate, a density and a cold xylene-soluble part ratio satisfy a particular relation, and a melting heat amount of the cold xylene-soluble part is 30 J/g or more, as an ethylene-α-olefin copolymer which is superior in a balance between extrusion ability, and anti-blocking property of an extruding article.

[Patent Literature 1] JP-A No. 4-213309 gazette
[Patent Literature 2] JP-A No. 2005-97481 gazette However, the previous ethylene-α-olefin copolymer has been requested to be further improved in a balance between a melt tension, an extrusion load at extruding, and a mechanical strength when produced into an article.

DISCLOSURE OF THE INVENTION

Under such circumstances, a problem to be solved by the present invention is to provide an ethylene-α-olefin copolymer which is excellent in a balance between a melt tension, an extrusion load at extruding, and a mechanical strength as compared with the previous ethylene-α-olefin copolymer, and an article obtained by extruding the copolymer.

That is, a first invention of the present invention relates to an ethylene-α-olefin copolymer comprising monomer units derived from ethylene and monomer units derived from an α-olefin having 3 to 20 carbon atoms, having a density (d) of 860 to 950 kg/m³, and having a melt flow rate (MFR) of 0.05 to 100 g/10 min, having a ratio (Mw/Mn) of a weight average molecular weight (Mw) thereof to a number average molecular weight (Mn) thereof of 2 to 10, having a swell ratio (SR) of less than 1.35, and having a g* defined by the following formula (I) of 0.50 to 0.75, $$g^*=[\eta/([\eta]_{GPC} \times g_{SCB}^*)] \quad (I)$$

wherein [η] represents the intrinsic viscosity (unit: dl/g) of the ethylene-α-olefin copolymer, and is defined by the following formula (I-I), [η]$_{GPC}$ is defined by the following formula (I-II), and g$_{SCB}$* is defined by the following formula (I-III), $$[\eta]=23.3 \times \log(\eta rel) \quad (I\text{-}I)$$

wherein ηrel represents the relative viscosity of an ethylene-α-olefin copolymer, $$[\eta]_{GPC}=0.00046 \times Mv^{0.725} \quad (I\text{-}II)$$

wherein Mv represents a viscosity average molecular weight of an ethylene-α-olefin copolymer, $$g_{SCB}^*=(1-A)^{1.725} \quad (I\text{-}III)$$

wherein A can be determined from the measurement of the content of short chain branches in the ethylene-α-olefin copolymer.

A second invention of the present invention relates to an article obtained by extruding the ethylene-α-olefin copolymer.

MODE FOR CARRYING OUT THE INVENTION

The ethylene-α-olefin copolymer of the present invention is an ethylene-α-olefin copolymer comprising monomer units derived from ethylene and monomer units derived from an α-olefin having 3 to 20 carbon atoms. Examples of the α-olefin include propylene, 1-butene, 1-pentene, 1-hexene, 1-heptene, 1-octene, 1-nonene, 1-decene, 1-dodecene, 4-methyl-1-pentene, 4-methyl-1-hexene, etc., and these may be used alone, or two or more kinds thereof may be used together. The α-olefin is preferably 1-butene, 1-hexene, 4-methyl-1-pentene, or 1-octene.

The ethylene-α-olefin copolymer of the present invention may comprise monomer units derived from other monomer in such a range that the effect of the present invention does not deteriorate, in addition to the monomer units derived from ethylene and the monomer units derived from an α-olefin having 3 to 20 carbon atoms. Examples of other monomer include a conjugated diene (e.g. butadiene and isoprene), a non-conjugated diene (e.g. 1,4-pentadiene), acrylic acid, acrylic acid ester (e.g. methyl acrylate and ethyl acrylate), methacrylic acid, methacrylic acid ester (e.g. methyl methacrylate and ethyl methacrylate), vinyl acetate, etc.

The content of monomer units derived from ethylene in the ethylene-α-olefin copolymer of the present invention is usually 50 to 99.5% by weight relative to a total weight (100% by weight) of the ethylene-α-olefin copolymer. The content of monomer units derived from an α-olefin is usually 0.5 to 50% by weight relative to a total amount (100% by weight) of the ethylene-α-olefin copolymer.

The ethylene-α-olefin copolymer of the present invention is preferably a copolymer comprising monomer units derived from ethylene and monomer units derived from an α-olefin having 4 to 20 carbon atoms, more preferably a copolymer comprising monomer units derived from ethylene and monomer units derived from an α-olefin having 5 to 20 carbon atoms, further preferably a copolymer comprising monomer units derived from ethylene and monomer units derived from an α-olefin having 6 to 8 carbon atoms.

Examples of the ethylene-α-olefin copolymer of the present invention include an ethylene-1-butene copolymer, an ethylene-1-hexene copolymer, an ethylene-4-methyl-1-pentene copolymer, an ethylene-1-octene copolymer, an ethylene-1-butene-1-hexene copolymer, an ethylene-1-butene-4-methyl-1-pentene copolymer, an ethylene-1-butene-1-octene copolymer, an ethylene-1-hexene-1-octene copolymer, etc. The ethylene-α-olefin copolymer is preferably an ethylene-1-hexene copolymer, an ethylene-4-methyl-1-pentene copolymer, an ethylene-1-butene-1-hexene copolymer, an ethylene-1-butene-1-octene copolymer, or an ethylene-1-hexene-1-octene copolymer.

A melt flow rate (hereinafter, described as "MFR" in some cases) of the ethylene-α-olefin copolymer of the present invention is usually 0.05 to 100 g/10 min. The melt flow rate is preferably 0.1 g/10 min or more, more preferably 0.2 g/10 min or more, from a view point of enhancement in molding ability, particularly from a view point of reduction in an extrusion load. From a view point of enhancement in a melt tension, and a mechanical strength of the resulting article, the melt flow rate is preferably 50 g/10 min or less, more preferably 30 g/10 min or less, further preferably 20 g/10 min or less, further more preferably 7 g/10 min or less, most preferably 3 g/10 min or less. The melt flow rate is a value measured by the A method, under the condition of a temperature of 190° C. and a load of 21.18 N, in the method defined in JIS K7210-1995. In measurement of the melt flow rate, usually, an ethylene-α-olefin copolymer in which around 1000 ppm of an antioxidant has been incorporated in advance is used. The melt flow rate of the ethylene-α-olefin copolymer can be changed, for example, by a hydrogen concentration or a polymerization temperature in the production method described later, and as a hydrogen concentration or a polymerization temperature is raised, the melt flow rate of the ethylene-α-olefin is increased.

A density (hereinafter, described as "d" in some cases) of the ethylene-α-olefin copolymer of the present invention is 860 to 950 kg/m$^3$, and from a view point of enhancement in an impact strength among a mechanical strength of the resulting article, is preferably 940 kg/m$^3$ or less, further preferably 935 kg/m$^3$ or less. Further, from a view point of enhancement in rigidity of the resulting article, the density is preferably 870 kg/m$^3$ or more, more preferably 880 kg/m$^3$ or more, further preferably 890 kg/m$^3$ or more, particularly preferably 900 kg/m$^3$ or more. The density is measured according to the method described in the A method of JIS K7112-1980, after annealing described in JIS K6760-1995. The density of ethylene-α-olefin copolymer can be changed by the content of monomer units derived from ethylene in the ethylene-α-olefin copolymer.

A ratio (hereinafter, described as "Mw/Mn" in some cases) of a weight average molecular weight (hereinafter, described as "Mw" in some cases) to a number average molecular weight (hereinafter, described as "Mn" in some cases) of the ethylene-α-olefin copolymer of the present invention is 2 to 10. In order to reduce an extrusion load at molding processing, Mw/Mn is 2 or more, preferably 2.5 or more, more preferably 3 or more, further preferably 3.5 or more. In order to enhance a mechanical strength of an article obtained using the ethylene-α-olefin copolymer of the present invention, Mw/Mn is 10 or less, preferably 9.5 or less, more preferably 9 or less.

Mw/Mn is a value (Mw/Mn) obtained by measuring a weight average molecular weight (Mw) and a number average molecular weight (Mn) by the gel permeation chromatograph (GPC) method, and dividing Mw by Mn. Examples of the measuring condition by the GPC method include the following condition.
(1) Apparatus: Waters 150C manufactured by Waters
(2) Separation column: TOSOH TSKgelGMH6-HT
(3) Measurement temperature: 140° C.
(4) Carrier: orthodichlorobenzene
(5) Flow rate: 1.0 mL/min
(6) Injection amount: 500 μL
(7) Detector: differential refraction
(8) Molecular weight standard substance: standard polystyrene g* defined by the following formula (I) of the ethylene-α-olefin copolymer of the present invention is 0.50 to 0.75. (Regarding g*, the following reference was referred: Developments in Polymer Characterisation-4, J. V. Dawkins, Ed., Applied Science, London, 1983, Chapter. I, "Characterization. of. Long Chain Branching in Polymers," authored by Th. G. Scholte)

$$g^* = [\eta]/([\eta]_{GPC} \times g_{SCB}^*) \quad (I)$$

wherein [η] represents the intrinsic viscosity (unit: dl/g) of an ethylene-α-olefin copolymer, and is defined by the following formula (I-I), $[\eta]_{GPC}$ is defined by the following formula (I-II), and $g_{SCB}^*$ is defined by the following formula (I-III).

$$[\eta]=23.3\times\log(\eta rel) \quad (\text{I-I})$$

wherein ηrel represents the relative viscosity of an ethylene-α-olefin copolymer.

$$[\eta]_{GPC}=0.00046\times Mv^{0.725} \quad (\text{I-II})$$

wherein Mv represents the viscosity average molecular weight of an ethylene-α-olefin copolymer.

$$g_{SCB}^*=(1-A)^{1.725} \quad (\text{I-III})$$

wherein A can be determined from the measurement of the content of short chain branches in the ethylene-α-olefin copolymer.

$[\eta]_{GPC}$ represents the intrinsic viscosity (unit: dl/g) of a hypothetical polymer in which it is postulated that a molecular weight distribution is the same molecular weight distribution as that of the ethylene-α-olefin copolymer of the present invention to be measured, and a molecular chain is straight.

$g_{SCB}^*$ represents contribution to g* to be generated by introduction of a short chain branch into an ethylene-α-olefin copolymer.

As the formula (I-II), the formula described in L. H. Tung, Journal of Polymer Science, 36, 130 (1959) pp. 287-294 was used.

The relative viscosity (ηrel) of an ethylene-α-olefin copolymer is obtained by dissolving 100 mg of an olefin polymer in 100 ml of tetralin containing 5% by weight of butylhydroxytoluene (BHT) as a thermal degradation preventing agent at 135° C. to prepare a sample solution, and calculating the relative viscosity from dropping times of the sample solution and a blank solution consisting of tetralin containing only 0.5% by weight of BHT as a thermal degradation preventing agent using the Ubbelohde-type viscometer.

The viscosity average molecular weight (Mv) of an ethylene-α-olefin copolymer is defined by the following formula (I-IV):

$$M_V = \left(\frac{\sum_{\mu=1}^{\infty} M_\mu^{a+1} n_\mu}{\sum_{\mu=1}^{\infty} M_\mu n_\mu}\right)^{1/a}, \quad (\text{I-IV})$$

and a=0.725 was adopted.

A in the formula (I-III) was evaluated by A=((12×n+2n+1)×y)/((1000−2y−2)×14+(y+2)×15+y×13), taking the branch carbon number of a short chain branch as n (e.g. n=2 when 1-butene is used as an α-olefin, and n=4 when 1-hexene is used), and taking the short chain branch number per 1000 carbon atoms obtained from NMR or infrared spectrometry as y.

g* is an index expressing a contraction degree of an ethylene-α-olefin copolymer in a solution, derived from a long chain branch. As an amount of a long chain branch contained in an ethylene-α-olefin copolymer is larger, contraction of a molecular chain becomes greater, and g* becomes smaller. Further, g* of the ethylene-α-olefin copolymer of the present invention is 0.50 to 0.75. In order to enhance a melt tension, g* is preferably 0.74 or less, more preferably 0.73 or less. In order to enhance a mechanical strength of an article obtained using the ethylene-α-olefin copolymer of the present invention, g* is preferably 0.55 or more, more preferably 0.60 or more.

A swell ratio (hereinafter, described as "SR" in some cases) of the ethylene-α-olefin copolymer of the present invention is less than 1.35. From a view point of enhancement in a mechanical strength of an article obtained using the ethylene-α-olefin copolymer, the swell ratio is preferably less than 1.30, more preferably less than 1.25. The swell ratio is a value $(D/D_0)$ obtained by cooling in air a strand of the ethylene-α-olefin copolymer extruded at a length of around 15 to 20 mm from an orifice under the condition of a temperature of 190° C. and a load of 21.18 N, upon measurement of a melt flow rate (MFR), measuring a diameter D (unit: mm) of the strand at a position of about 5 mm from a tip on an extrusion upstream side, and dividing the diameter D by an orifice diameter 2.095 mm $(D_0)$. The swell ratio can be changed, for example, by a hydrogen concentration or an electron donating compound concentration in the production method described later and, when a hydrogen concentration is increased, the swell ratio of an ethylene-α-olefin copolymer becomes greater.

The method for producing the ethylene-α-olefin copolymer of the present invention is a catalyst for copolymerizing ethylene with an α-olefin, formed by bringing the following component (A1), the following component (A2), the following component (B), and the following component (C) into contact with each other, wherein the molar ratio ((A1)/(A2)) of the component (A1) to the component (A2) is from 1 to 90:

component (A1): a transition metal component represented by the following general formula (1),

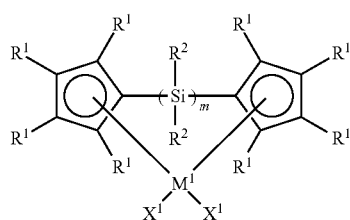

(1)

wherein $M^1$ represents a transition metal atom of Group 4 in the periodic table of the elements; m represents an integer of 1 to 5; $X^1$, $R^1$, and $R^2$ are the same or different, and each independently represent a hydrogen atom, a halogen atom, an optionally substituted hydrocarbyl group having 1 to 20 carbon atoms, an optionally substituted hydrocarbyloxy group having 1 to 20 carbon atoms, a hydrocarbylsilyl group having 1 to 20 carbon atoms, or a hydrocarbylamino group having 1 to 20 carbon atoms; the $X^1$ groups may be the same or different; the $R^1$ groups may be the same or different; and the $R^2$ groups may be the same or different, component (A2): a transition metal compound represented by the following general formula (2),

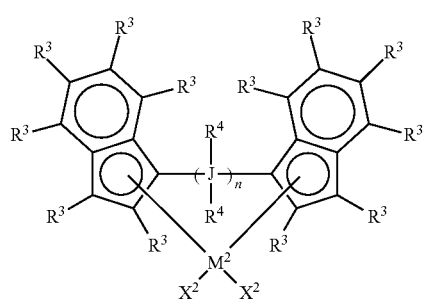

(2)

wherein $M^2$ represents a transition metal atom of Group 4 in the periodic table of the elements; J represents an atom of Group 14 in the periodic table of the elements: n represents an integer of 1 to 5; $X^2$, $R^3$, and $R^4$ are the same or different, and each independently represent a hydrogen atom, a halogen atom, an optionally substituted hydrocarbyl group having 1 to 20 carbon atoms, an optionally substituted hydrocarbyloxy group having 1 to 20 carbon atoms, a hydrocarbylsilyl group having 1 to 20 carbon atoms, or a hydrocarbylamino group having 1 to 20 carbon atoms; the $X^2$ groups may be the same or different; the $R^3$ groups may be the same or different; and the $R^4$ groups may be the same or different, component (B): a catalyst component formed by bringing the following component (b1), the following component (b2), and the following component (b3) into contact with each other;

(b1): compound represented by the following general formula (3)

$$M^3L_x \quad (3)$$

wherein, $M^3$ represents a lithium atom, a sodium atom, a potassium atom, a rubidium atom, a cesium atom, a beryllium atom, a magnesium atom, a calcium atom, a strontium atom, a barium atom, a zinc atom, a germanium atom, a tin atom, a lead atom, an antimony atom or a bismuth atom, and x represents a number corresponding to the valence of $M^3$. L represents a hydrogen atom, a halogen atom, or an optionally substituted hydrocarbyl group having 1 to 20 carbon atoms, and when there are two or more L, they may be the same or different.

(b2): compound represented by the following general formula (4)

$$R^5_{t-1}T^1H \quad (4)$$

wherein $T^1$ represents an oxygen atom, a sulfur atom, a nitrogen atom or a phosphorus atom, and t represents a number corresponding to the valence of $T^1$. $R^5$ represents a halogen atom, an electron-withdrawing group, a halogen atom-containing group or a group containing an electron-withdrawing group and, when there are two or more $R^5$ groups, they may be the same or different.

(b3): compound represented by the following general formula (5)

$$R^6_{s-2}T^2H_2 \quad (5)$$

wherein $T^2$ represents an oxygen atom, a sulfur atom, a nitrogen atom or a phosphorus atom, and s represents a number corresponding to the valence of $T^2$. $R^6$ represents a hydrocarbyl group having 1 to 20 carbon atoms or a halogenated hydrocarbyl group having 1 to 20 carbon atoms.

component (C): an organoaluminum compound.

$M^1$ in the general formula (1) and $M^2$ in the general formula (2) represent a transition metal atom of Group 4 in the periodic table of the elements, and examples include a titanium atom, a zirconium atom, a hafnium atom, etc.

J in the general formula (2) represents an atom of Group 14 in the periodic table of the elements. It is preferable that they be a carbon atom or a silicon atom.

Further, m in the general formula (1) and n in the general formula (2) are an integer of 1 to 5. It is preferable that m be 1 to 2. It is preferable that n be 1 to 2.

Further, m in the general formula (1) and n in the general formula (2) are an integer of 1 to 5. It is preferable that m be 1 to 2. It is preferable that n be 1 to 2.

$X^1$, $R^1$, and $R^2$ in the general formula (1), and $X^2$, $R^3$, and $R^4$ in the general formula (2) are the same or different, and each independently represent a hydrogen atom, a halogen atom, an optionally substituted hydrocarbyl group having 1 to 20 carbon atoms, an optionally substituted hydrocarbyloxy group having 1 to 20 carbon atoms, a hydrocarbylsilyl group having 1 to 20 carbon atoms, or a hydrocarbylamino group having 1 to 20 carbon atoms, the $X^1$ groups may be the same or different, the $R^1$ groups or the $R^2$ groups may be the same or different, the $X^2$ groups may be the same or different, and the $R^3$ groups or the $R^4$ groups may be the same or different.

Examples of the halogen atom of $X^1$, $R^1$, $R^2$, $X^2$, $R^3$, and $R^4$ include a fluorine atom, a chlorine atom, a bromine atom, an iodine atom, etc.

Examples of the optionally substituted hydrocarbyl group having 1 to 20 carbon atoms of $X^1$, $R^1$, $R^2$, $X^2$, $R^3$, and $R^4$ include an alkyl group having 1 to 20 carbon atoms, a halogenated alkyl group having 1 to 20 carbon atoms, an aralkyl group having 7 to 20 carbon atoms, an aryl group having 6 to 20 carbon atoms, etc.

Examples of the alkyl group having 1 to 20 carbon atoms include a methyl group, an ethyl group, a n-propyl group, an isopropyl group, a n-butyl group, a sec-butyl group, a tert-butyl group, a n-pentyl group, a neopentyl group, an isopentyl group, a n-hexyl group, a n-heptyl group, a n-octyl group, a n-decyl group, a n-nonyl group, a n-decyl group, a n-dodecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, a n-eicosyl group, etc.

Examples of the halogenated alkyl group having 1 to 20 carbon atoms include a fluoromethyl group, a difluoromethyl group, a trifluoromethyl group, a chloromethyl group, a dichloromethyl group, a trichloromethyl group, a bromomethyl group, a dibromomethyl group, a tribromomethyl group, an iodomethyl group, a diiodomethyl group, a triiodomethyl group, a fluoroethyl group, a difluoroethyl group, a trifluoroethyl group, a tetrafluoroethyl group, a pentafluoroethyl group, a chloroethyl group, a dichloroethyl group, a trichloroethyl group, a tetrachloroethyl group, a pentaethyl group, a bromoethyl group, a dibromoethyl group, a tribromoethyl group, a tetrabromoethyl group, a pentabromoethyl group, a perfluoropropyl group, a perfluorobutyl group, a perfluoropentyl group, a perfluorohexyl group, a perfluorooctyl group, a perfluorododecyl group, a perfluoropentadecyl group, a perfluoroeicosyl group, a perchloropropyl group, a perchlorobutyl group, a perchloropentyl group, a perchlorohexyl group, a perchlorooctyl group, a perchlorododecyl group, a perchloropentadecyl group, a perchloroeicosyl group, a perbromopropyl group, a perbromobutyl group, a perbromopentyl group, a perbromohexyl group, a perbromooctyl group, a perbromododecyl group, a perbromopentadecyl group, a perbromoeicosyl group, etc.

Examples of the aralkyl group having 7 to 20 carbon atoms include a benzyl group, a (2-methylphenyl)methyl group, a (3-methylphenyl)methyl group, a (4-methylphenyl)methyl group, a (2,3-dimethylphenyl)methyl group, a (2,4-dimethylphenyl)methyl group, a (2,5-dimethylphenyl)methyl group, a (2,6-dimethylphenyl)methyl group, a (3,4-dimethylphenyl)methyl group, a (4,6-dimethylphenyl)methyl group, a (2,3,4-trimethylphenyl)methyl group, a (2,3,5-trimethylphenyl)methyl group, a (2,3,6-trimethylphenyl)methyl group, a (3,4,5-trimethylphenyl)methyl group, a (2,4,6-trimethylphenyl)methyl group, a (2,3,4,5-tetramethylphenyl)methyl group, a (2,3,4,6-tetramethylphenyl)methyl group, a (2,3 5,6-tetramethylphenyl)methyl group, a (pentamethylphenyl) methyl group, an (ethylphenyl)methyl group, a (n-propylphenyl)methyl group, an (isopropylphenyl)methyl group, a (n-butylphenyl)methyl group, a (sec-butylphenyl)methyl group, a (tert-butylphenyl)methyl group, a (n-pentylphenyl) methyl group, a (neopentylphenyl)methyl group, a (n-hexylphenyl)methyl group, a (n-octylphenyl)methyl group, a (n-decylphenyl)methyl group, a (n-decylphenyl)methyl group, a (n-tetradecylphenyl)methyl group, a naphthylmethyl group, an anthracenylmethyl group, a phenylethyl group, a phenylpropyl group, a phenylbutyl group, a diphenylmethyl group, a diphenylethyl group, a diphenylpropyl group, a diphenylbutyl group, etc. In addition, examples include halogenated aralkyl groups in which these aralkyl groups are substituted with a halogen atom such as a fluorine atom, a chlorine atom, a bromine atom, or an iodine atom.

Examples of the aryl group having 6 to 20 carbon atoms include a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a diethylphenyl group, a triethylphenyl group, a n-propylphenyl group, an isopropylphenyl group, a n-butylphenyl group, a sec-butylphenyl group, a tert-butylphenyl group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group, an anthracenyl group, etc. In addition, examples include halogenated aryl groups in which these aryl groups are substituted with a halogen atom such as a fluorine atom, a chlorine atom, a bromine atom, or an iodine atom.

Examples of the optionally substituted hydrocarbyl group having 1 to 20 carbon atoms include a hydrocarbyl group substituted with a hydrocarbylsilyl group, a hydrocarbyl group substituted with a hydrocarbylamino group, and a hydrocarbyl group substituted with a hydrocarbyloxy group.

Examples of the hydrocarbyl group substituted with a hydrocarbylsilyl group include a trimethylsilylmethyl group, a trimethylsilylethyl group, a trimethylsilylpropyl group, a trimethylsilylbutyl group, a trimethylsilylphenyl group, a bis(trimethylsilyl)methyl group, a bis(trimethylsilyl)ethyl group, a bis(trimethylsilyl)propyl group, a bis(trimethylsilyl)butyl group, a bis(trimethylsilyl)phenyl group, a triphenylsilylmethyl group, etc.

Examples of the hydrocarbyl group substituted with a hydrocarbylamino group include a dimethylaminomethyl group, a dimethylaminoethyl group, a dimethylaminopropyl group, a dimethylaminobutyl group, a dimethylaminophenyl group, a bis(dimethylamino)methyl group, a bis(dimethylamino)ethyl group, a bis(dimethylamino)propyl group, a bis(dimethylamino)butyl group, a bis(dimethylamino)phenyl group, a phenylaminomethyl group, a diphenylaminomethyl group, a diphenylaminophenyl group, etc.

Examples of the hydrocarbyl group substituted with a hydrocarbyloxy group include a methoxymethyl group, an ethoxymethyl group, a n-propoxymethyl group, an isopropoxymethyl group, a n-butoxymethyl group, a sec-butoxymethyl group, a tert-butoxymethyl group, a phenoxymethyl group, a methoxyethyl group, an ethoxyethyl group, a n-propoxyethyl group, an isopropoxyethyl group, a n-butoxyethyl group, a sec-butoxyethyl group, a tert-butoxyethyl group, a phenoxyethyl group, a methoxy-n-propyl group, an ethoxy-n-propyl group, a n-propoxy-n-propyl group, an isopropoxy-n-propyl group, a n-butoxy-n-propyl group, a sec-butoxy-n-propyl group, a tert-butoxy-n-propyl group, a phenoxy-n-propyl group, a methoxyisopropyl propyl group, an ethoxyisopropyl group, a n-propoxyisopropyl group, an isopropoxyisopropyl group, a n-butoxyisopropyl group, a sec-butoxyisopropyl group, a tert-butoxyisopropyl group, a phenoxyisopropyl group, a methoxyphenyl group, an ethoxyphenyl group, a n-propoxyphenyl group, an isopropoxyphenyl group, a n-butoxyphenyl group, a sec-butoxyphenyl group, a tert-butoxyphenyl group, a phenoxyphenyl group, etc.

Examples of the optionally substituted hydrocarbyloxy group having 1 to 20 carbon atoms of $X^1$, $R^1$, $R^2$, $X^2$, $R^3$, and $R^4$ include an alkoxy group having 1 to 20 carbon atoms, an aralkyloxy group having 7 to 20 carbon atoms, an aryloxy group having 6 to 20 aryloxy groups, etc.

Examples of the alkoxy group having 1 to 20 carbon atoms include a methoxy group, an ethoxy group, a n-propoxy group, an isopropoxy group, a n-butoxy group, a sec-butoxy group, a tert-butoxy group, a n-pentyloxy group, a neopentyloxy group, a n-hexyloxy group, a n-octyloxy group, a n-nonyloxy group, a n-decyloxy group, a n-undecyloxy group, a n-dodecyloxy group, a n-tridecyloxy group, a n-tetradecyloxy group, a n-pentadecyloxy group, a n-hexadecyloxy group, a n-heptadecyloxy group, a n-heptadecyloxy group, a n-octadecyloxy group, a n-nonadecyloxy group, a n-eicosoxy group, etc. In addition, examples include halogenated alkoxy groups in which these alkoxy groups are substituted with a halogen atom such as a fluorine atom, a chlorine atom, a bromine atom, or an iodine atom.

Examples of the aralkyloxy group having 7 to 20 carbon atoms include a benzyloxy group, a (2-methylphenyl)methoxy group, a (3-methylphenyl)methoxy group, a (4-methylphenyl) methoxy group, a (2,3-dimethylphenyl)methoxy group, a (2,4-dimethylphenyl)methoxy group, a (2,5-dimethylphenyl)methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, a (2,3,6-trimethylphenyl)methoxy group, a (2,4,5-trimethylphenyl) methoxy group, a (2,4,6-trimethylphenyl)methoxy group, a (3,4,5-trimethylphenyl)methoxy group, a (2,3,4,5-tetramethylphenyl)methoxy group, a (2,3,4,6-tetramethylphenyl) methoxy group, a (2,3,5,6-tetramethylphenyl)methoxy group, a (pentamethylphenyl)methoxy group, an (ethylphenyl)methoxy group, a (n-propylphenyl)methoxy group, an (isopropylphenyl)methoxy group, a (n-butylphenyl)methoxy group, a (sec-butylphenyl)methoxy group, a (tert-butylphenyl)methoxy group, a (n-hexylphenyl)methoxy group, a (n-octylphenyl)methoxy group, a (n-decylphenyl)methoxy group, a (n-tetradecylphenyl)methoxy group, a naphthylmethoxy group, an anthracenylmethoxy group, etc. In addition, examples include halogenated aralkyloxy groups in which these aralkyloxy groups are substituted with a halogen atom such as a fluorine atom, a chlorine atom, a bromine atom, or an iodine atom.

Examples of the aryloxy group having 6 to 20 carbon atoms include a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 3,4,5-trimethylphenoxy group, a 2,3,4,5-tetramethylphenoxy group, a 2,3,4,6-tetramethylphenoxy group, a 2,3,5,6-tetramethylphenoxy group, a pentamethylphenoxy group, an ethylphenoxy group, a n-propylphenoxy group, an isopropylphenoxy group, a n-butylphenoxy group, a sec-butylphenoxy group, a tert-butylphenoxy group, a n-hexylphenoxy group, a n-octylphenoxy group, a n-decylphenoxy group, a n-tetradecylphenoxy group, a naphthoxy group, an anthracenoxy group, etc. In addition, examples include halogenated aryloxy groups in which these aryloxy groups are substituted with a halogen atom such as a fluorine atom, a chlorine atom, a bromine atom, or an iodine atom.

The hydrocarbylsilyl group having 1 to 20 carbon atoms of $X^1$, $R^1$, $R^2$, $X^2$, $R^3$, and $R^4$ is a silyl group substituted with a hydrocarbyl group having 1 to 20 carbon atoms, and examples of the hydrocarbyl group having 1 to 20 carbon atoms include an alkyl group having 1 to 20 carbon atoms, an aryl group having 6 to 20 carbon atoms, etc. Examples of the hydrocarbylsilyl group having 1 to 20 carbon atoms include a monohydrocarbylsilyl group having 1 to 20 carbon atoms, a dihydrocarbylsilyl group having 2 to 20 carbon atoms, a trihydrocarbylsilyl group having 3 to 20 carbon atoms, etc., examples of the monohydrocarbylsilyl group having 1 to 20 carbon atoms include a methylsilyl group, an ethylsilyl group, a n-propylsilyl group, an isopropylsilyl group, a n-butylsilyl group, a sec-butylsilyl group, a tert-butylsilyl group, an isobutylsilyl group, a n-pentylsilyl group, a n-hexylsilyl group, an phenylsilyl group, etc., examples of the dihydrocarbylsilyl group having 2 to 20 carbon atoms include a dimethylsilyl group, a diethylsilyl group, a di-n-propylsilyl group, a diisopropylsilyl group, a di-n-butylsilyl group, a di-sec-butylsilyl group, a di-tert-butylsilyl group, a diisobutylsilyl group, a diphenylsilyl group, etc., and examples of the trihydrocarbylsilyl having 3 to 20 carbon atoms include a trimethylsilyl group, a triethylsilyl group, a tri-n-propylsilyl group, a triisopropylsilyl group, a tri-n-butylsilyl group, a tri-sec-butylsilyl group, a tri-tert-butylsilyl group, a triisobutylsilyl group, a tert-butyl-dimethylsilyl group, a tri-n-pentylsilyl group, a tri-n-hexylsilyl group, a tricyclohexylsillyl group, a triphenylsilyl group, etc.

The hydrocarbylamino group having 1 to 20 carbon atoms of $X^1$, $R^1$, $R^2$, $X^2$, $R^3$, and $R^4$ is an amino group substituted with a hydrocarbyl group having 1 to 20 carbon atoms, and examples of the hydrocarbyl group having 1 to 20 carbon atoms include an alkyl group having 1 to 20 carbon atoms, an aryl group having 6 to 20 carbon atoms, an aralkyl group having 7 to 20 carbon atoms, etc. Examples of the hydrocarbylamino group having 1 to 20 carbon atoms include a monohydrocarbylamino group having 1 to 20 carbon atoms, a dihydrocarbylamino group having 2 to 20 carbon atoms, etc., examples of the monohydrocarbylamino group having 1 to 20 carbon atoms include a methylamino group, an ethylamino group, a n-propylamino group, an isopropylamino group, a n-butylamino group, a sec-butylamino group, a tert-butylamino group, an isobutylamino group, a n-hexylamino group, a n-octylamino group, a n-decylamino group, a phenylamino group, a benzylamino group, etc., and examples of the dihydrocarbylamino group having 2 to 20 carbon atoms include a dimethylamino group, a diethylamino group, a di-n-propylamino group, a diisopropylamino group, a di-n-butylamino group, a di-sec-butylamino group, a di-tert-butylamino group, a di-isobutylamino group, a tert-butylisopropylamino group, a di-n-hexylamino group, a di-n-octylamino group, a di-n-decylamino group, a diphenylamino group, a dibenzylamino group, a tert-butylisopropylamino group, a phenylethylamino group, a phenylpropylamino group, a phenylbutylamino group, a pyrrolyl group, a pyrrolidinyl group, a piperidinyl group, a carbazolyl group, a dihydroisoindolyl group, etc.

$X^1$ is preferably a chlorine atom, a methyl group, an ethyl group, a n-propyl group, an isopropyl group, a n-butyl group, a methoxy group, an ethoxy group, a n-propoxy group, an isopropoxy group, a n-butoxy group, a trifluoromethoxy group, a phenyl group, a phenoxy group, a 2,6-di-tert-butylphenoxy group, a 3,4,5-trifluorophenoxy group, a pentafluorophenoxy group, a 2,3,5,6-tetrafluoro-4-pentafluorophenylphenoxy group, or a benzyl group.

$R^1$ is preferably a hydrogen atom, or an alkyl group having 1 to 6 carbon atoms, more preferably a hydrogen atom, or an alkyl group having 1 to 4 carbon atoms, further preferably a hydrogen atom.

$R^2$ is preferably an alkyl group having 1 to 6 carbon atoms, more preferably an alkyl group having 1 to 4 carbon atoms.

$X^2$ is preferably a chlorine atom, a methyl group, an ethyl group, a n-propyl group, an isopropyl group, a n-butyl group, a methoxy group, an ethoxy group, a n-propoxy group, an isopropoxy group, a n-butoxy group, a trifluoromethoxy group, a phenyl group, a phenoxy group, a 2,6-di-tert-butylphenoxy group, a 3,4,5-trifluorophenoxy group, a pentafluorophenoxy group, a 2,3,5,6-tetrafluoro-4-pentafluorophenylphenoxy group, or a benzyl group.

$R^3$ is preferably a hydrogen atom, or an alkyl group having 1 to 6 carbon atoms, more preferably a hydrogen atom, or an alkyl group having 1 to 4 carbon atoms, further preferably a hydrogen atom.

$R^4$ is preferably an alkyl group having 1 to 6 carbon atoms, more preferably an alkyl group having 1 to 4 carbon atoms.

Examples of the transition metal compound of the component (A1) represented by the general formula (1) in which $M^1$ is a zirconium atom, and $X^1$ is a chlorine atom include dimethylsilanediylbis(cyclopentadienyl)zirconium dichloride, diethylsilanediylbis(cyclopentadienyl)zirconium dichloride, di(n-propyl)silanediylbis(cyclopentadienyl)zirconium dichloride, diisopropylsilanediylbis(cyclopentadienyl)zirconium dichloride, dicyclohexylsilanediylbis(cyclopentadienyl)zirconium dichloride, diphenylsilanediylbis(cyclopentadienyl)zirconium dichloride, di(p-tolyl)silanediylbis(cyclopentadienyl)zirconium dichloride, divinylsilanediylbis(cyclopentadienyl)zirconium dichloride, diallylsilanediylbis(cyclopentadienyl)zirconium dichloride, (methyl)(vinyl)silanediylbis(cyclopentadienyl)zirconium dichloride, (allyl)(methyl)silanediylbis(cyclopentadienyl)zirconium dichloride, (ethyl)(methyl)silanediylbis(cyclopentadienyl)zirconium dichloride, (methyl)(n-propyl)silanediylbis(cyclopentadienyl)zirconium dichloride, (methyl)(isopropyl)silanediylbis(cyclopentadienyl)zirconium dichloride, (cyclohexyl)(methyl)bis(cyclopentadienyl)zirconium dichloride, (methyl)(phenyl)silanediylbis(cyclopentadienyl)zirconium dichloride, dimethylsilanediylbis(methylcyclopentadienyl)zirconium dichloride, diethylsilanediylbis(methylcyclopentadienyl)zirconium dichloride, di(n-propyl)silanediylbis(methylcyclopentadienyl)zirconium dichloride, diisopropylsilanediylbis(methylcyclopentadienyl)zirconium dichloride, dicyclohexylsilanediylbis(methylcyclopentadienyl)zirconium dichloride, diphenylsilanediylbis(methylcyclopentadienyl)zirconium dichloride, (ethyl)(methyl)silanediylbis(methylcyclopentadienyl)zirconium dichloride, (methyl)(n-propyl)silanediylbis(methylcyclopentadienyl)zirconium dichloride, (methyl)(isopropyl)silanediylbis(methylcyclopentadienyl)zirconium dichloride, (cyclohexyl)(methyl)bis(methylcyclopentadienyl)zirconium dichloride, (methyl)(phenyl)silanediylbis(methylcyclopentadienyl)zirconium dichloride, dimethylsilanediyl(cyclopentadienyl)(methylcyclopentadienyl)zirconium dichloride, diethylsilanediyl(cyclopentadienyl)(methylcyclopentadienyl)zirconium dichloride, di(n-propyl)silanediyl(cyclopentadienyl)(methylcyclopentadienyl)zirconium dichloride, diisopropylsilanediyl(cyclopentadienyl)(methylcyclopentadienyl)zirconium dichloride, dicyclohexylsilanediyl(cyclopentadienyl)(methylcyclopentadienyl)zirconium dichloride, diphenylsilanediyl(cyclopentadienyl)(methylcyclopentadienyl)zirconium dichloride, (ethyl)(methyl)silanediyl(cyclopentadienyl)(methylcyclopentadienyl)zirconium dichloride, (methyl)(n-propyl)silanediyl(cyclopentadienyl)(methylcyclopentadienyl)zirconium dichloride, (methyl)(isopropyl)silanediyl(cyclopentadienyl)(methylcyclopentadienyl)zirconium dichloride, (cyclohexyl)(methyl)(cyclopentadienyl)(methylcyclopentadienyl)zirconium dichloride, (methyl)(phenyl)silanediyl(cyclopentadienyl)(methylcyclopentadienyl)zirconium dichloride, dimethylsilanediylbis(2,3-dimethylcyclopentadienyl)zirconium dichloride, dimethylsilanediylbis(2,4-dimethylcyclopentadienyl)zirconium dichloride, dimethylsilanediylbis(2,5-dimethylcyclopentadienyl)zirconium dichloride, dimethylsilanediylbis(3,4-dimethylcyclopentadienyl)zirconium dichloride, diethylsilanediylbis(2,3-dimethylcyclopentadienyl)zirconium dichloride, diethylsilanediylbis(2,4-dimethylcyclopentadienyl)zirconium dichloride, diethylsilanediylbis(2,5-dimethylcyclopentadienyl)zirconium dichloride, diethylsilanediylbis(3,4-dimethylcyclopentadienyl)zirconium dichloride, di(n-propyl)silanediylbis(2,3-dimethylcyclopentadienyl)zirconium dichloride, di(n-propyl)silanediylbis(2,4-dimethylcyclopentadienyl)zirconium dichloride, di(n-propyl)silanediylbis(2,5-dimethylcyclopentadienyl)zirconium dichloride, di(n-propyl)silanediylbis(3,4-dimethylcyclopentadienyl)zirconium dichloride, diisopropylsilanediylbis(2,3-dimethylcyclopentadienyl)zirconium dichloride, diisopropylsilanediylbis(2,4-dimethylcyclopentadienyl)zirconium dichloride, diisopropylsilanediylbis(2,5-dimethylcyclopentadienyl)zirconium dichloride, diisopropylsilanediylbis(3,4-dimethylcyclopentadienyl)zirconium dichloride, dicyclohexylsilanediylbis(2,3-dimethylcyclopentadienyl)zirconium dichloride, dicyclohexylsilanediylbis(2,4-dimethylcyclopentadienyl)zirconium dichloride, dicyclohexylsilanediylbis(2,5-dimethylcyclopentadienyl)zirconium dichloride, dicyclohexylsilanediylbis(3,4-dimethylcyclopentadienyl)zirconium dichloride, diphenylsilanediylbis(2,3-dimethylcyclopentadienyl)zirconium dichloride, diphenylsilanediylbis(2,4-dimethylcyclopentadienyl)zirconium dichloride, diphenylsilanediylbis(2,5-dimethylcyclopentadienyl)zirconium dichloride, diphenylsilanediylbis(3,4-dimethylcyclopentadienyl)zirconium dichloride, (ethyl)(methyl)silanediylbis(2,3-dimethylcyclopentadienyl)zirconium dichloride, (ethyl)(methyl)silanediylbis(2,4-dimethylcyclopentadienyl)zirconium dichloride, (ethyl)(methyl)silanediylbis(2,5-dimethylcyclopentadienyl)zirconium dichloride, (ethyl)(methyl)silanediylbis(3,4-dimethylcyclopentadienyl)zirconium dichloride, (methyl)(n-propyl)silanediylbis(2,3-dimethylcyclopentadienyl)zirconium dichloride, (methyl)(n-propyl)silanediylbis(2,4-dimethylcyclopentadienyl)zirconium dichloride, (methyl)(n-propyl)silanediylbis(2,5-dimethylcyclopentadienyl)zirconium dichloride, (methyl)(n-propyl)silanediylbis(3,4-dimethylcyclopentadienyl)zirconium dichloride, (methyl)(isopropyl)silanediylbis(2,3-dimethylcyclopentadienyl)zirconium dichloride, (methyl)(isopropyl)silanediylbis(2,4-dimethylcyclopentadienyl)zirconium dichloride, (methyl)(isopropyl)silanediylbis(2,5-dimethylcyclopentadienyl)zirconium dichloride, (methyl)(isopropyl)silanediylbis(3,4-dimethylcyclopentadienyl)zirconium dichloride, (cyclohexyl)(methyl)bis(2,3-dimethylcyclopentadienyl)zirconium dichloride, (cyclohexyl)(methyl)bis(2,4-dimethylcyclopentadienyl)zirconium dichloride, (cyclohexyl)(methyl)bis(2,5-dimethylcyclopentadienyl)zirconium dichloride, (cyclohexyl)(methyl)bis(3,4-dimethylcyclopentadienyl)zirconium dichloride, (methyl)(phenyl)silanediylbis(2,3-dimethylcyclopentadienyl)zirconium dichloride, (methyl)(phenyl)silanediylbis(2,4-dimethylcyclopentadienyl)zirconium dichloride, (methyl)(phenyl)silanediylbis(2,5-dimethylcyclopentadienyl)zirconium dichloride, (methyl)(phenyl)silanediylbis(3,4-dimethylcyclopentadienyl)zirconium dichloride etc.

A substituted body of the $\eta^5$-cyclopentadienyl group in the above examples, when a bridging group is at a 1-position, in the case of a monosubstituted body, includes substituted bodies at a 2-position, a 3-position, a 4-position, and a 5-position, and includes similarly all combinations when a bridging position is other than a 1-position. The substituent body includes similarly all combinations of substituents and bridging positions, also in the case of a di-or more substituted body. Examples include compounds in which dichloride of $X^1$ of the transition metal compound is changed with difluoride, dibromide, diiodide, dimethyl, diethyl, diisopropyl, dimethoxide, diethoxide, dipropoxide, dibutoxide, bis(trifluoromethoxide), diphenyl, diphenoxide, bis(2,6-di-tert-butylphenoxide), bis(3,4,5-trifluorophenoxide), bis(pentafluorophenoxide), bis(2,3,5,6-tetrafluoro-4-pentafluorophenylphenoxide), dibenzyl, etc. Further, examples include compounds in which zirconium of $M^1$ of the transition metal compound is changed with titanium or hafnium.

The transition metal compound of the component (A1) represented by the general formula (1) is preferably dimethylsilanediylbis(cyclopentadienyl)zirconium dichloride.

Examples of the transition metal compound of the component (A2) represented by the general formula (2) in which $M^2$ is a zirconium atom, and $X^2$ is a chlorine atom include methylenebis(indenyl)zirconium dichloride, isopropylidenebis(indenyl)zirconium dichloride, (methyl)(phenyl)methylenebis(indenyl)zirconium dichloride, diphenylmethylenebis(indenyl)zirconium dichloride, ethylenebis(indenyl)zirconium dichloride, methylenebis(methylindenyl)zirconium dichloride, isopropylidenebis(methylindenyl)zirconium dichloride, (methyl)(phenyl)methylenebis(methylindenyl)zirconium dichloride, diphenylmethylenebis(methylindenyl)zirconium dichloride, ethylenebis(methylindenyl)zirconium dichloride, methylene(indenyl)(methylindenyl)zirconium dichloride, isopropylidene(indenyl)(methylindenyl)zirconium dichloride, (methyl)(phenyl)methylene(indenyl)(methylindenyl)zirconium dichloride, diphenylmethylene(indenyl)(methylindenyl)zirconium dichloride, ethylene(indenyl)(methylindenyl)zirconium dichloride, methylenebis(2,4-dimethylindenyl)zirconium dichloride, isopropylidenebis(2,4-dimethylindenyl)zirconium dichloride, (methyl)(phenyl)methylenebis(2,4-dimethylindenyl)zirconium dichloride, diphenylmethylenebis(2,4-dimethylindenyl)zirconium dichloride, ethylenebis(2,4-dimethylindenyl)zirconium dichloride, dimethylsilanediylbis(indenyl)zirconium dichloride, diethylsilanediylbis(indenyl)zirconium dichloride, di(n-propyl)silanediylbis(indenyl)zirconium dichloride, diisopropylsilanediylbis(indenyl)zirconium dichloride, dicyclohexylsilanediylbis(indenyl)zirconium dichloride, diphenylsilanediylbis(indenyl)zirconium dichloride, di(p-tolyl)silanediylbis(indenyl)zirconium dichloride, divinylsilanediylbis(indenyl)zirconium dichloride, diallylsilanediylbis(indenyl)zirconium dichloride, (methyl)(vinyl)silanediylbis(indenyl)zirconium dichloride, (allyl)(methyl)silanediylbis(indenyl)zirconium dichloride, (ethyl)(methyl)silanediylbis(indenyl)zirconium dichloride, (methyl)(n-propyl)silanediylbis(indenyl)zirconium dichloride, (methyl)(isopropyl)silanediylbis(indenyl)zirconium dichloride, (cyclohexyl)(methyl)bis(indenyl)zirconium dichloride, (methyl)(phenyl)silanediylbis(indenyl)zirconium dichloride, dimethylsilanediylbis(methylindenyl)zirconium dichloride, diethylsilanediylbis(methylindenyl)zirconium dichloride, di(n-propyl)silanediylbis(methylindenyl)zirconium dichloride, diisopropylsilanediylbis(methylindenyl)zirconium dichloride, dicyclohexylsilanediylbis(methylindenyl)zirconium dichloride, diphenylsilanediylbis(methylindenyl)zirconium dichloride, (ethyl)(methyl)silanediylbis(methylindenyl)zirconium dichloride, (methyl)(n-propyl)silanediylbis(methylindenyl)zirconium dichloride, (methyl)(isopropyl)silanediylbis(methylindenyl)zirconium dichloride, (cyclohexyl)(methyl)bis(methylindenyl)zirconium dichloride, (methyl)(phenyl)silanediylbis(methylindenyl)zirconium dichloride, dimethylsilanediyl(indenyl)(methylindenyl)zirconium dichloride, diethylsilanediyl(indenyl)(methylindenyl)zirconium dichloride, di(n-propyl)silanediyl(indenyl)(methylindenyl)zirconium dichloride, diisopropylsilanediyl(indenyl)(methylindenyl)zirconium dichloride, dicyclohexylsilanediyl(indenyl)(methylindenyl)zirconium dichloride, diphenylsilanediyl(indenyl)(methylindenyl)zirconium dichloride, (ethyl)(methyl)silanediyl(indenyl)(methylindenyl)zirconium dichloride, (methyl)(n-propyl)silanediyl(indenyl)(methylindenyl)zirconium dichloride, (methyl)(isopropyl)silanediyl(indenyl)(methylindenyl)zirconium dichloride, (cyclohexyl)(methyl)(indenyl)(methylindenyl)zirconium dichloride, (methyl)(phenyl)silanediyl(indenyl)(methylindenyl)zirconium dichloride, dimethylsilanediylbis(2,4-dimethylindenyl)zirconium dichloride, diethylsilanediylbis(2,4-dimethylindenyl)zirconium dichloride, di(n-propyl)silanediylbis(2,4-dimethylindenyl)zirconium dichloride, diisopropylsilanediylbis(2,4-dimethylindenyl)zirconium dichloride, dicyclohexylsilanediylbis(2,4-dimethylindenyl)zirconium dichloride, diphenylsilanediylbis(2,4-dimethylindenyl)zirconium dichloride, (ethyl)(methyl)silanediylbis(2,4-dimethylindenyl)zirconium dichloride, (methyl)(n-propyl)silanediylbis(2,4-dimethylindenyl)zirconium dichloride, (methyl)(isopropyl)silanediylbis(2,4-dimethylindenyl)zirconium dichloride, (cyclohexyl)(methyl)bis(2,4-dimethylindenyl)zirconium dichloride, (methyl)(phenyl)silanediylbis(2,4-dimethylindenyl)zirconium dichloride, etc.

A substituted body of the $\eta^5$-cyclopentadienyl group in the above examples, when a bridging group is at a 1-position, in the case of a monosubstituted body, includes substituted bodies at a 2-position, a 3-position, a 4-position, a 5-position, a 6-position, and a 7-position, and includes similarly all combinations when a bridging position is other than a 1-position. The substituent body includes similarly all combinations of substituents and bridging positions, also in the case of a di-or more substituted body. Examples thereof include compounds in which dichloride of $X^2$ of the transition metal compound is changed with difluoride, dibromide, diiodide, dimethyl, diethyl, diisopropyl, dimethoxide, diethoxide, dipropoxide, dibutoxide, bis(trifluoromethoxide), diphenyl, diphenoxide, bis(2,6-di-tert-butylphenoxide), bis(3,4,5-trifluorophenoxide), bis(pentafluorophenoxide), bis(2,3,5,6-tetrafluoro-4-pentafluorophenylphenoxide), dibenzyl, etc. Further, examples include compounds in which zirconium of $M^2$ of the transition metal compound is changed with titanium or hafnium.

The transition metal compound of the component (A2) represented by the general formula (2) is preferably ethylenebis(indenyl)zirconium diphenoxide, ethylenebis(indenyl)zirconium dichloride, or dimethylsilanediylbis(indenyl)zirconium dichloride, more preferably ethylenebis(indenyl)zirconium diphenoxide.

x in the general formula (3) represents a number corresponding to the valence of $M^3$. For example, when $M^3$ is a zinc atom, x is 2.

L in the general formula (3) represents a hydrogen atom, a halogen atom, or an optionally substituted hydrocarbyl group having 1 to 20 carbon atoms, and when there are two or more L, they may be the same or different.

Examples of the halogen atom of L include a fluorine atom, a chlorine atom, a bromine atom, an iodine atom, etc.

Examples of the optionally substituted hydrocarbyl group having 1 to 20 carbon atoms of L include an alkyl group having 1 to 20 carbon atoms, an aralkyl group having 7 to 20 carbon atoms, an aryl group having 6 to 20 carbon atoms, a halogenated alkyl group having 1 to 20 carbon atoms, etc.

Examples of the alkyl group having 1 to 20 carbon atoms of L include a methyl group, an ethyl group, a n-propyl group, an isopropyl group, a n-butyl group, a sec-butyl group, a tert-butyl group, a n-pentyl group, a neopentyl group, an isopentyl group, a n-hexyl group, a n-heptyl group, a n-octyl group, a n-decyl group, a n-nonyl group, a n-decyl group, a n-dodecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, a n-eicosyl group, etc. It is preferably a methyl group, an ethyl group, an isopropyl group, a tert-butyl group, or an isobutyl group.

Examples of the halogenated alkyl group having 1 to 20 carbon atoms of L include a fluoromethyl group, a difluoromethyl group, a trifluoromethyl group, a chloromethyl group, a dichloromethyl group, a trichloromethyl group, a bromomethyl group, a dibromomethyl group, a tribromomethyl group, an iodomethyl group, a diiodomethyl group, a triiodomethyl group, a fluoroethyl group, a difluoroethyl group, a trifluoroethyl group, a tetrafluoroethyl group, a pentafluoroethyl group, a chloroethyl group, a dichloroethyl group, a trichloroethyl group, a tetrachloroethyl group, a pentachloroethyl group, a bromoethyl group, a dibromoethyl group, a tribromoethyl group, a tetrabromoethyl group, a pentabromoethyl group, a perfluoropropyl group, a perfluorobutyl group, a perfluoropentyl group, a perfluorohexyl group, a perfluorooctyl group, a perfluorododecyl group, a perfluoropentadecyl group, a perfluoroeicosyl group, a perchloropropyl group, a perchlorobutyl group, a perchloropentyl group, a perchlorohexyl group, a perchlorooctyl group, a perchlorododecyl group, a perchloropentadecyl group, a perchloroeicosyl group, a perbromopropyl group, a perbromobutyl group, a perbromopentyl group, a perbromohexyl group, a perbromooctyl group, a perbromododecyl group, a perbromopentadecyl group, a perbromoeicosyl group, etc.

Examples of the aralkyl group having 7 to 20 carbon atoms of L include a benzyl group, a (2-methylphenyl)methyl group, a (3-methylphenyl)methyl group, a (4-methylphenyl)methyl group, a (2,3-dimethylphenyl)methyl group, a (2,4-dimethylphenyl)methyl group, a (2,5-dimethylphenyl)methyl group, a (2,6-dimethylphenyl)methyl group, a (3,4-dimethylphenyl)methyl group, a (4,6-dimethylphenyl)methyl group, a (2,3,4-trimethylphenyl)methyl group, a (2,3,5-trimethylphenyl)methyl group, a (2,3,6-trimethylphenyl)methyl group, a (3,4,5-trimethylphenyl)methyl group, a (2,4,6-trimethylphenyl)methyl group, a (2,3,4,5-tetramethylphenyl)methyl group, a (2,3,4,6-tetramethylphenyl)methyl group, a (2,3,5,6-tetramethylphenyl)methyl group, a (pentamethylphenyl)methyl group, an (ethylphenyl)methyl group, a (n-propylphenyl)methyl group, an (isopropylphenyl)methyl group, a (n-butylphenyl)methyl group, a (sec-butylphenyl)methyl group, a(tert-butylphenyl)methyl group, a (n-pentylphenyl)methyl group, a (neopentylphenyl)methyl group, a (n-hexylphenyl)methyl group, a (n-octylphenyl)methyl group, a (n-decylphenyl)methyl group, a (n-decylphenyl)methyl group, a (n-tetradecylphenyl)methyl group, a naphthylmethyl group, an anthracenylmethyl group, a phenylethyl group, a phenylpropyl group, a phenylbutyl group, a diphenylmethyl group, a diphenylethyl group, a diphenylpropyl group, a diphenylbutyl group, etc. It is preferably a benzyl group. In addition, examples include halogenated aralkyl groups having 7 to 20 carbon atoms in which these aralkyl groups are substituted with a halogen atom such as a fluorine atom, a chlorine atom, a bromine atom, or an iodine atom.

Examples of the aryl group having 6 to 20 carbon atoms of L include a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a diethylphenyl group, a triethylphenyl group, a n-propylphenyl group, an isopropylphenyl group, a n-butylphenyl group, a sec-butylphenyl group, a tert-butylphenyl group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group, an anthracenyl group, etc. It is preferably a phenyl group. In addition, examples include halogenated aryl groups having 6 to 20 carbon atoms in which these aryl groups are substituted with a halogen atom such as a fluorine atom, a chlorine atom, a bromine atom, or an iodine atom.

L is preferably a hydrogen atom, an alkyl group having 1 to 20 carbon atoms, or an aryl group having 6 to 20 carbon atoms, more preferably a hydrogen atom or an alkyl group having 1 to 20 carbon atoms, further preferably an alkyl group having 1 to 20 carbon atoms.

$T^1$ in the general formula (4) is an oxygen atom, a sulfur atom, a nitrogen atom, or a phosphorus atom, preferably a nitrogen atom or an oxygen atom, more preferably an oxygen atom.

Further, t in the general formula (4) represents the valence of $T^1$, and when $T^1$ is an oxygen atom or a sulfur atom, t is 2, and when $T^1$ is a nitrogen atom or a phosphorus atom, t is 3.

$R^5$ in the general formula (4) represents a halogen atom, an electron-withdrawing group, a halogen atom-containing group, or a group containing an electron-withdrawing group, and represents a group containing an electron-withdrawing group or an electron-withdrawing group, and when there are two or more $R^5$, they may be the same or different. As an index of electron-withdrawing property, a substituent constant σ, etc., of the Hammett equation are known, and examples of the electron-withdrawing group include a functional group in which a substituent constant σ of the Hammett equation is positive.

Examples of the halogen atom of $R^5$ include a fluorine atom, a chlorine atom, a bromine atom, and an iodine atom.

Examples of the electron-withdrawing group of $R^5$ include a cyano group, a nitro group, a carbonyl group, a hydrocarbyloxycarbonyl group, a sulfone group, a phenyl group etc.

Examples of the halogen atom-containing group of $R^5$ include a halogenated hydrocarbyl group having 1 to 20 carbon atoms such as a halogenated alkyl group having 1 to 20 carbon atoms, a halogenated aralkyl group having 7 to 20 carbon atoms, a halogenated aryl group having 6 to 20 carbon atoms, a (halogenated alkyl)aryl group having 7 to 20 carbon atoms; a halogenated hydrocarbyloxy group having 1 to 20 carbon atoms; a halogenated hydrocarbyloxycarbonyl group having 2 to 20 carbon atoms. In addition, examples of the group having an electron-withdrawing group of $R^5$ include a cyanized hydrocarbyl group having 1 to 20 carbon atoms such as a cyanized aryl group having 6 to 20 carbon atoms, a nitrated hydrocarbyl group having 1 to 20 carbon atoms such as a nitrated aryl group having 6 to 20 carbon atoms, etc.

Examples of the halogenated alkyl group having 1 to 20 carbon atoms of $R^5$ include a fluoromethyl group, a chloromethyl group, a bromomethyl group, an iodomethyl group, a difluoromethyl group, a dichloromethyl group, a dibromomethyl group, a diiodomethyl group, a trifluoromethyl group, a trichloromethyl group, a tribromomethyl group, a triiodomethyl group, a 2,2,2-trifluoroethyl group, a 2,2,2-trichloroethyl group, a 2,2,2-tribromoethyl group, a 2,2,2-triiodoethyl group, a 2,2,3,3,3-pentafluoropropyl group, a 2,2,3,3,3-pentachloropropyl group, a 2,2,3,3,3-pentabromopropyl group, a 2,2,3,3,3-pentaiodopropyl group, a 2,2,2-trifluoro-1-trifluoromethylethyl group, a 2,2,2-trichloro-1-trichloromethylethyl group, a 2,2,2-tribromo-1-tribromomethylethyl group, a 2,2,2-triiodo-1-triiodomethylethyl group, a 1,1-bis(trifluoromethyl)-2,2,2-trifluoroethyl group, a 1,1-bis(trichloromethyl)-2,2,2-trichloroethyl group, a 1,1-bis(tribromomethyl)-2,2,2-tribromoethyl group, a 1,1-bis(triiodomethyl)-2,2,2-triiodoethyl group, etc.

Examples of the halogenated aryl group having 6 to 20 carbon atoms of $R^5$ include a 2-fluorophenyl group, a 3-fluorophenyl group, a 4-fluorophenyl group, a 2,4-difluorophenyl group, a 2,6-difluorophenyl group, a 3,4-difluorophenyl group, a 3,5-difluorophenyl group, a 2,4,6-trifluorophenyl group, a 3,4,5-trifluorophenyl group, a 2,3,5,6-tetrafluorophenyl group, a pentafluorophenyl group, a 2,3,5,6-tetrafluoro-4-trifluoromethylphenyl group, a 2,3,5,6-tetrafluoro-4-pentafluorophenylphenyl group, a perfluoro-1-naphthyl group, a perfluoro-2-naphthyl group, a 2-chlorophenyl group, a 3-chlorophenyl group, a 4-chlorophenyl group, a 2,4-dichlorophenyl group, a 2,6-dichlorophenyl group, a 3,4-dichlorophenyl group, a 3,5-dichlorophenyl group, a 2,4,6-trichlorophenyl group, a 3,4,5-trichlorophenyl group, a 2,3,5,6-tetrachlorophenyl group, a pentachlorophenyl group, a 2,3,5,6-tetrachloro-4-trichloromethylphenyl group, a 2,3,5,6-tetrachloro-4-pentachlorophenylphenyl group, a perchloro-1-naphthyl group, a perchloro-2-naphthyl group, a 2-bromophenyl group, a 3-bromophenyl group, a 4-bromophenyl group, a 2,4-dibromophenyl group, a 2,6-dibromophenyl group, a 3,4-dibromophenyl group, a 3,5-dibromophenyl group, a 2,4,6-tribromophenyl group, a 3,4,5-tribromophenyl group, a 2,3,5,6-tetrabromophenyl group, a pentabromophenyl group, a 2,3,5,6-tetrabromo-4-tribromomethylphenyl group, a 2,3,5,6-tetrabromo-4-pentabromophenylphenyl group, a perbromo-1-naphthyl group, a perbromo-2-naphthyl group, a 2-iodophenyl group, a 3-iodophenyl group, a 4-iodophenyl group, a 2,4-diiodophenyl group, a 2,6-diiodophenyl group, a 3,4-diiodophenyl group, a 3,5-diiodophenyl group, a 2,4,6-triiodophenyl group, a 3,4,5-triiodophenyl group, a 2,3,5,6-tetraiodophenyl group, a pentaiodophenyl group, a 2,3,5,6-tetraiodo-4-triiodomethylphenyl group, a 2,3,5,6-tetraiodo-4-pentaiodophenylphenyl group, a periodo-1-naphthyl group, a periodo-2-naphthyl group, etc.

Examples of the (halogenated alkyl)aryl group having 7 to 20 carbon atoms of $R^5$ include a 2-(trifluoromethyl)phenyl group, a 3-(trifluoromethyl)phenyl group, a 4-(trifluoromethyl)phenyl group, a 2,6-bis(trifluoromethyl)phenyl group, a 3,5-bis(trifluoromethyl)phenyl group, a 2,4,6-tris(trifluoromethyl)phenyl group, a 3,4,5-tris(trifluoromethyl)phenyl group, etc.

Examples of the cyanized aryl group having 5 to 20 carbon atoms of $R^5$ include a 2-cyanophenyl group, a 3-cyanophenyl group, a 4-cyanophenyl group, etc.

Examples of the nitrated aryl group having 5 to 20 carbon atoms of $R^5$ include a 2-nitrophenyl group, a 3-nitrophenyl group, a 4-nitrophenyl group, etc.

Examples of the hydrocarbyloxycarbonyl group having 2 to 20 carbon atoms of $R^5$ include an alkoxycarbonyl group, an aralkyloxycarbonyl group, an aryloxycarbonyl group, etc., more specifically, examples include a methoxycarbonyl group, an ethoxycarbonyl group, a n-propoxycarbonyl group, an isopropoxycarbonyl group, a phenoxycarbonyl group, etc.

Examples of the halogenated hydrocarbyloxycarbonyl group having 2 to 20 carbon atoms of $R^5$ include a halogenated alkoxycarbonyl group, a halogenated aralkyloxycarbonyl group, a halogenated aryloxycarbonyl group, etc., more specifically, examples include a trifluoromethoxycarbonyl group, a pentafluorophenoxycarbonyl group, etc.

$R^5$ is preferably a halogenated hydrocarbyl group having 1 to 20 carbon atoms, more preferably a halogenated alkyl group having 1 to 20 carbon atoms or a halogenated aryl group having 6 to 20 carbon atoms, further preferably a fluorinated alkyl group having 1 to 20 carbon atoms, a fluorinated aryl group having 7 to 20 carbon atoms, a chlorinated alkyl group having 1 to 20 carbon atoms, or a chlorinated aryl group having 6 to 20 carbon atoms, particularly preferably a fluorinated alkyl group having 1 to 20 carbon atoms or a fluorinated aryl group having 6 to 20 carbon atoms. The fluorinated alkyl group having 1 to 20 carbon atoms is preferably a fluoromethyl group, a difluoromethyl group, a trifluoromethyl group, a 2,2,2-trifluoroethyl group, a 2,2,3,3,3-pentafluoropropyl group, a 2,2,2-trifluoro-1-trifluoromethylethyl group, or a 1,1-bis(trifluoromethyl)-2,2,2-trifluoroethyl group, more preferably a trifluoromethyl group, a 2,2,2-trifluoro-1-trifluoromethylethyl group, or a 1,1-bis(trifluoromethyl)-2,2,2-trifluoroethyl group. The fluorinated aryl group having 6 to 20 carbon atoms is preferably a 2-fluorophenyl group, a 3-fluorophenyl group, a 4-fluorophenyl group, a 2,4-difluorophenyl group, a 2,6-difluorophenyl group, a 3,4-difluorophenyl group, a 3,5-difluorophenyl group, a 2,4,6-trifluorophenyl group, a 3,4,5-trifluorophenyl group, a 2,3,5,6-tetrafluorophenyl group, a pentafluorophenyl group, a 2,3,5,6-tetrafluoro-4-trifluoromethylphenyl group, a 2,3,5,6-tetrafluoro-4-pentafluorophenylphenyl group, a perfluoro-1-naphthyl group, or a perfluoro-2-naphthyl group, more preferably a 3,5-difluorophenyl group, a 3,4,5-trifluorophenyl group, or a pentafluorophenyl group. The chlorinated alkyl group having 1 to 20 carbon atoms is preferably a chloromethyl group, a dichloromethyl group, a trichloromethyl group, a 2,2,2-trichloroethyl group, a 2,2,3,3,3-pentachloropropyl group, a 2,2,2-trichloro-1-trichloromethylethyl group, or a 1,1-bis(trichloromethyl)-2,2,2-trichloroethyl group. The chlorinated aryl group having 6 to 20 carbon atoms is preferably a 4-chlorophenyl group, a 2,6-dichlorophenyl group, a 3,5-dichlorophenyl group, a 2,4,6-trichlorophenyl group, a 3,4,5-trichlorophenyl group or a pentachlorophenyl group.

$T^2$ in the general formula (5) is an oxygen atom, a sulfur atom, a nitrogen atom, or a phosphorous atom, preferably a nitrogen atom or an oxygen atom, more preferably an oxygen atom.

Further, s in the general formula (5) represents the valence of $T^2$, and when $T^2$ is an oxygen atom or a sulfur atom, s is 2, and when $T^2$ is a nitrogen atom or a phosphorus atom, s is 3.

$R^6$ in the general formula (5) represents a hydrocarbyl group having 1 to 20 carbon atoms or a halogenated hydrocarbyl group having 1 to 20 carbon atoms. Examples of the hydrocarbyl group having 1 to 20 carbon atoms of $R^6$ include an alkyl group having 1 to 20 carbon atoms, an aralkyl group having 7 to 20 carbon atoms, an aryl group having 6 to 20 carbon atoms, etc., and groups exemplified as the alkyl group having 1 to 20 carbon atoms, the aralkyl group having 7 to 20 carbon atoms, and the aryl group having 6 to 20 carbon atoms of L can be exemplified. Examples of the halogenated hydrocarbyl group having 1 to 20 carbon atoms of $R^6$ include a halogenated hydrocarbyl group having 1 to 20 carbon atoms such as a halogenated alkyl group having 1 to 20 carbon atoms, a halogenated aralkyl group having 7 to 20 carbon atoms, a halogenated aryl group having 6 to 20 carbon atoms, or a (halogenated alkyl)aryl group having 7 to 20 carbon atoms, etc., and examples of the halogenated alkyl group having 1 to 20 carbon atoms include the halogenated aryl group having 6 to 20 carbon atoms, and the (halogenated alkyl)aryl group having 7 to 20 carbon atoms of $R^5$.

$R^6$ is preferably a halogenated hydrocarbyl group having 1 to 20 carbon atoms, more preferably a fluorinated hydrocarbyl group having 1 to 20 carbon atoms.

Examples of the compound represented by the general formula (3) of the component (b1), wherein $M^3$ is a zinc atom, include dialkylzinc such as dimethylzinc, diethylzinc, di-n-propylzinc, diisopropylzinc, di-n-butylzinc, diisobutylzinc, and di-n-hexylzinc; diarylzinc such as diphenylzinc, dinaphthylzinc, and bis(pentafluorophenyl)zinc; dialkenylzinc such as diallylzinc; bis(cyclopentadienyl)zinc; halogenated alkylzinc such as methylzinc chloride, ethylzinc chloride, n-propylzinc chloride, isopropylzinc chloride, n-butylzinc chloride, isobutylzinc chloride, n-hexylzinc chloride, methylzinc bromide, ethylzinc bromide, n-propylzinc bromide, isopropylzinc bromide, n-butylzinc bromide, isobutylzinc bromide, n-hexylzinc bromide, methylzinc iodide, ethylzinc iodide, n-propylzinc iodide, isopropylzinc iodide, n-butylzinc iodide, isobutylzinc iodide, and n-hexylzinc iodide; halogenated zinc such as zinc fluoride, zinc chloride, zinc bromide, and zinc iodide; etc.

The compound represented by the general formula (3) of the compound (b1) is preferably dialkylzinc, further preferably dimethylzinc, diethylzinc, di-n-propylzinc, diisopropylzinc, di-n-butylzinc, diisobutylzinc, or di-n-hexylzinc, particularly preferably dimethylzinc or diethylzinc.

Examples of the compound represented by the general formula (4) of the component (b2) include amine, phosphine, alcohol, thiol, phenol, thiophenol, naphthol, naphthylthiol, carboxylic acid compound, etc.

Examples of the amine include di(fluoromethyl)amine, bis(difluoromethyl)amine, bis(trifluoromethyl)amine, bis(2,2,2-trifluoroethyl)amine, bis(2,2,3,3,3-pentafluoropropyl)amine, bis(2,2,2-trifluoro-1-trifluoromethylethyl)amine, bis(1,1-bis(trifluoromethyl)-2,2,2-trifluoroethyl)amine, bis(2-fluorophenyl)amine, bis(3-fluorophenyl)amine, bis(4-fluorophenyl)amine, bis(2,6-difluorophenyl)amine, bis(3,5-difluorophenyl)amine, bis(2,4,6-trifluorophenyl)amine, bis(3,4,5-trifluorophenyl)amine, bis(pentafluorophenyl)amine, bis(2-(trifluoromethyl)phenyl)amine, bis(3-(trifluoromethyl)phenyl)amine, bis(4-(trifluoromethyl)phenyl)amine, bis(2,6-di(trifluoromethyl)phenyl)amine, bis(3,5-di(trifluoromethyl)phenyl)amine, bis(2,4,6-tri(trifluoromethyl)phenyl)amine, bis(2-cyanophenyl)amine, (3-cyanophenyl)amine, bis(4-cyanophenyl)amine, bis(2-nitrophenyl)amine, bis(3-nitrophenyl)amine, bis(4-nitrophenyl)amine, bis(1H,1H-perfluorobutyl)amine, bis(1H,1H-perfluoropentyl)amine, bis(1H,1H-perfluorohexyl)amine, bis(1H,1H-perfluorooctyl)amine, bis(1H,1H-perfluorododecyl)amine, bis(1H,1H-perfluoropentadecyl)amine, bis(1H,1H-perfluoroeicosyl)amine, etc. In addition, examples includes amines in which fluoro of these amines is changed with chloro, bromo, or iodo.

Examples of the phosphine include compounds in which a nitrogen atom of the amines is changed with a phosphorus atom. Those phosphines are compounds represented by substituting amine in the amines with phosphine.

Examples of the alcohol include fluoromethanol, difluoromethanol, trifluoromethanol, 2,2,2-trifluoroethanol, 2,2,3,3,3-pentafluoropropanol, 2,2,2-trifluoro-1-trifluoromethylethanol, 1,1-bis(trifluoromethyl)-2,2,2-trifluoroethanol, 1H,1H-perfluorobutanol, 1H,1H-perfluoropentanol, 1H,1H-perfluorohexanol, 1H,1H-perfluorooctanol, 1H,1H-perfluorododecanol, 1H,1H-perfluoropentadecanol, 1H,1H-perfluoroeicosanol, etc. In addition, examples include alcohols in which fluoro of these alcohols is changed with chloro, bromo, or iodo.

Examples of the thiol include compounds in which an oxygen atom of the alcohols is changed with a sulfur atom. Those thiols are compounds represented by substituting nol in the alcohols with nthiol.

Examples of the phenol include 2-fluorophenol, 3-fluorophenol, 4-fluorophenol, 2,4-difluorophenol, 2,6-difluorophenol, 3,4-difluorophenol, 3,5-difluorophenol, 2,4,6-trifluorophenol, 3,4,5-trifluorophenol, 2,3,5,6-tetrafluorophenol, pentafluorophenol, 2,3,5,6-tetrafluoro-4-trifluoromethylphenol, 2,3,5,6-tetrafluoro-4-pentafluorophenylphenol, etc. In addition, examples include phenols in which fluoro of these phenols is changed with chloro, bromo, or iodo.

Examples of the thiophenol include compounds in which an oxygen atom of the phenols is changed with a sulfur atom. Those thiophenols are compounds represented by substituting phenol in the phenols with thiophenol.

Examples of the naphthol include perfluoro-1-naphthol, perfluoro-2-naphthol, 4,5,6,7,8-pentafluoro-2-naphthol, 2-(trifluoromethyl)phenol, 3-(trifluoromethyl)phenol, 4-(trifluoromethyl)phenol, 2,6-bis(trifluoromethyl)phenol, 3,5-bis(trifluoromethyl)phenol, 2,4,6-tris(trifluoromethyl)phenol, 2-cyanophenol, 3-cyanophenol, 4-cyanophenol, 2-nitrophenol, 3-nitrophenol, 4-nitrophenol, etc. In addition, examples include naphthols in which fluoro of these naphthols is changed with chloro, bromo, or iodo.

Examples of the naphthylthiol include compounds in which an oxygen atom of the naphthols is changed with a sulfur atom. Those naphthiols are compounds represented by substituting naphthol in the naphthols with naphthylthiol.

Examples of the carboxylic acid compound include pentafluorobenzoic acid, perfluoroethanoic acid, perfluoropropanoic acid, perfluorobutanoic acid, perfluoropentanoic acid, perfluorohexanoic acid, perfluoroheptanoic acid, perfluorooctanoic acid, perfluorononanoic acid, perfluorodecanoic acid, perfluoroundecanoic acid, perfluorododecanoic acid, etc.

The compound represented by the general formula (4) of the component (b2) is preferably an amine, alcohol, or phenol compound, the amine is preferably bis(trifluoromethyl)amine, bis(2,2,2-trifluoroethyl)amine, bis(2,2,3,3,3-pentafluoropropyl)amine, bis(2,2,2-trifluoro-1-trifluoromethylethyl)amine, bis(1,1-bis(trifluoromethyl)-2,2,2-trifluoroethyl)amine, or bis(pentafluorophenyl)amine, the alcohol is preferably trifluoromethanol, 2,2,2-trifluoroethanol, 2,2,3,3,3-pentafluoropropanol, 2,2,2-trifluoro-1-trifluoromethylethanol, or 1,1-bis(trifluoromethyl)-2,2,2-trifluoroethanol, and the phenol is preferably 2-fluorophenol, 3-fluorophenol, 4-fluorophenol, 2,6-difluorophenol, 3,5-difluorophenol, 2,4,6-trifluorophenol, 3,4,5-trifluorophenol, pentafluorophenol, 2-(trifluoromethyl)phenol, 3-(trifluoromethyl)phenol, 4-(trifluoromethyl)phenol, 2,6-bis(trifluoromethyl)phenol, 3,5-bis(trifluoromethyl)phenol, 2,4,6-tris(trifluoromethyl)phenol, or 3,4,5-tris(trifluoromethyl)phenol.

The compound represented by the general formula (4) of the component (b2) is more preferably bis(trifluoromethyl)amine, bis(pentafluorophenyl)amine, trifluoromethanol, 2,2,2-trifluoro-1-trifluoromethylethanol, 1,1-bis(trifluoromethyl)-2,2,2-trifluoroethanol, 2-fluorophenol, 3-fluorophenol, 4-fluorophenol, 2,6-difluorophenol, 3,5-difluorophenol, 2,4,6-trifluorophenol, 3,4,5-trifluorophenol, pentafluorophenol, 4-(trifluoromethyl)phenol, 2,6-bis(trifluoromethyl)phenol, or 2,4,6-tris(trifluoromethyl)phenol, further preferably 3,5-difluorophenol, 3,4,5-trifluorophenol, pentafluorophenol, or 1,1-bis(trifluoromethyl)-2,2,2-trifluoroethanol.

Examples of the compound represented by the general formula (5) of the component (b3) include water, hydrogen sulfide, amine, aniline compound, etc.

Examples of the amine include alkylamine such as methylamine, ethylamine, n-propylamine, isopropylamine, n-butylamine, sec-butylamine, tert-butylamine, isobutylamine, n-pentylamine, neopentylamine, isopentylamine, n-hexylamine, n-octylamine, n-decylamine, n-dodecylamine, n-pentadecylamine, and n-eicosylamine; aralkylamine such as benzylamine, (2-methylphenyl)methylamine, (3-methylphenyl)methylamine, (4-methylphenyl)methylamine, (2,3-dimethylphenyl)methylamine, (2,4-dimethylphenyl)methylamine, (2,5-dimethylphenyl)methylamine, (2,6-dimethylphenyl)methylamine, (3,4-dimethylphenyl)methylamine, (3,5-dimethylphenyl)methylamine, (2,3,4-trimethylphenyl)methylamine, (2,3,5-trimethylphenyl)methylamine, (2,3,6-trimethylphenyl)methylamine, (3,4,5-trimethylphenyl)methylamine, (2,4,6-trimethylphenyl)methylamine, (2,3,4,5-tetramethylphenyl)methylamine, (2,3,4,6-tetramethylphenyl)methylamine, (2,3,5,6-tetramethylphenyl)methylamine, (pentamethylphenyl)methylamine, (ethylphenyl)methylamine, (n-propylphenyl)methylamine, (isopropylphenyl)methylamine, (n-butylphenyl)methylamine, (sec-butylphenyl)methylamine, (tert-butylphenyl)methylamine, (n-pentylphenyl)methylamine, (neopentylphenyl)methylamine, (n-hexylphenyl)methylamine, (n-octylphenyl)methylamine, (n-decylphenyl)methylamine, (n-tetradecylphenyl)methylamine, naphthylmethylamine, and anthracenylmethylamine; allylamine; cyclopentadienylamine; etc.

Examples of the amine include halogenated alkylamine such as fluoromethylamine, difluoromethylamine, trifluoromethylamine, 2,2,2-trifluoroethylamine, 2,2,3,3,3-pentafluoropropylamine, 2,2,2-trifluoro-1-trifluoromethylethylamine, 1,1-bis(trifluoromethyl)-2,2,2-trifluoroethylamine, perfluoropropylamine, perfluorobutylamine, perfluoropentylamine, perfluorohexylamine, perfluorooctylamine, perfluorododecylamine, perfluoropentadecylamine, and perfluoroeicosylamine, etc. In addition, examples includes amines in which fluoro of these amines is changed with chloro, bromo, or iodo.

Examples of the aniline compound include aniline, naphthylamine, anthracenylamine, 2-methylaniline, 3-methylaniline, 4-methylaniline, 2,3-dimethylaniline, 2,4-dimethylaniline, 2,5-dimethylaniline, 2,6-dimethylaniline, 3,4-dimethylaniline, 3,5-dimethylaniline, 2,3,4-trimethylaniline, 2,3,5-trimethylaniline, 2,3,6-trimethylaniline, 2,4,6-trimethylaniline, 3,4,5-trimethylaniline, 2,3,4,5-tetramethylaniline, 2,3,4,6-tetramethylaniline, 2,3,5,6-tetramethylaniline, pentamethylaniline, 2-ethylaniline, 3-ethylaniline, 4-ethylaniline, 2,3-diethylaniline, 2,4-diethylaniline, 2,5-diethylaniline, 2,6-diethylaniline, 3,4-diethylaniline, 3,5-diethylaniline, 2,3,4-triethylaniline, 2,3,5-triethylaniline, 2,3,6-triethylaniline, 2,4,6-triethylaniline, 3,4,5-triethylaniline, 2,3,4,5-tetraethylaniline, 2,3,4,6-tetraethylaniline, 2,3,5,6-tetraethylaniline, pentaethylaniline, etc. In addition, examples include aniline compounds in which ethyl of these aniline compounds is changed with n-propyl, isopropyl, n-butyl, sec-butyl, tert-butyl, n-pentyl, neopentyl, n-hexyl, n-octyl, n-decyl, n-dodecyl, n-tetradecyl, etc.

Examples of the aniline compound include 2-fluoroaniline, 3-fluoroaniline, 4-fluoroaniline, 2,6-difluoroaniline, 3,5-difluoroaniline, 2,4,6-trifluoroaniline, 3,4,5-trifluoroaniline, pentafluoroaniline, 2-(trifluoromethyl)aniline, 3-(trifluoromethyl)aniline, 4-(trifluoromethyl)aniline, 2,6-di(trifluoromethyl)aniline, 3,5-di(trifluoromethyl)aniline, 2,4,6-tri(trifluoromethyl)aniline, 3,4,5-tri(trifluoromethyl)aniline, etc. In addition, examples include aniline compounds in which fluoro of these aniline compounds is changed with chloro, bromo, iodo, etc.

The compound represented by the general formula (5) of the component (b3) is preferably water, hydrogen sulfide, methylamine, ethylamine, n-propylamine, isopropylamine, n-butylamine, sec-butylamine, tert-butylamine, isobutylamine, n-octylamine, aniline, 2,6-dimethylaniline, 2,4,6-trimethylaniline, naphthylamine, anthracenylamine, benzylamine, trifluoromethylamine, pentafluoroethylamine, perfluoropropylamine, perfluorobutylamine, perfluoropentylamine, perfluorohexylamine, perfluorooctylamine, perfluorododecylamine, perfluoropentadecylamine, perfluoroeicosylamine, 2-fluoroaniline, 3-fluoroaniline, 4-fluoroaniline, 2,6-difluoroaniline, 3,5-difluoroaniline, 2,4,6-trifluoroaniline, 3,4,5-trifluoroaniline, pentafluoroaniline, 2-(trifluoromethyl)aniline, 3-(trifluoromethyl)aniline, 4-(trifluoromethyl)aniline, 2,6-bis(trifluoromethyl)aniline, 3,5-bis(trifluoromethyl)aniline, 2,4,6-tris(trifluoromethyl)aniline, or 3,4,5-tris(trifluoromethyl)aniline, particularly preferably water, trifluoromethylamine, perfluorobutylamine, perfluorooctylamine, perfluoropentadecylamine, 2-fluoroaniline, 3-fluoroaniline, 4-fluoroaniline, 2,6-difluoroaniline, 3,5-difluoroaniline, 2,4,6-trifluoroaniline, 3,4,5-trifluoroaniline, pentafluoroaniline, 2-(trifluoromethyl)aniline, 3-(trifluoromethyl)aniline, 4-(trifluoromethyl)aniline, 2,6-bis(trifluoromethyl)aniline, 3,5-bis(trifluoromethyl)aniline, 2,4,6-tris(trifluoromethyl)aniline, or 3,4,5-tris(trifluoromethyl)aniline, most preferably water or pentafluoroaniline.

The component (B) is formed by bringing the component (b1), the component (b2) and the component (b3) into contact with each other. Examples of an order of bringing the component (b1), the component (b2) and the component (b3) into contact with each other include the following orders.

[1] The component (b1) and the component (b2) are brought into contact with each other, and the contact product derived from the contact is brought into contact with the component (b3).

[2] The component (b1) and the component (b3) are brought into contact with each other, and the contact product derived from the contact is brought into contact with the component (b2)

[3] The component (b2) and the component (b3) are brought into contact with each other, and the contact product derived from the contact is brought into contact with the component (b1).

It is preferable that contact between the component (b1), the component (b2) and the component (b3) be performed under the inert gas atmosphere. A contact temperature is usually −100 to 300° C., preferably −80 to 200° C. A contact time is usually 1 minute to 200 hours, preferably 10 minutes to 100 hours. A solvent may be used for contact, or these compounds may be directly brought into contact with each other without using a solvent.

When a solvent is used, the solvent which does not react with the component (b1), the component (b2) and the component (b3), and the contact product thereof is used. However, as described above, when respective components are contacted step-wisely, even a solvent which reacts with a certain component at a certain stage, but does not react with respective components at other stage can be used at other stage. That is, solvents at respective stages are the same as, or different from one another. Examples of the solvent include a nonpolar solvent such as an aliphatic hydrocarbon solvent, and an aromatic hydrocarbon solvent; a polar solvent such as a halogenated solvent, an ether solvent, an alcohol solvent, a phenol solvent, a carbonyl solvent, a phosphoric acid derivative, a nitrile solvent, a nitro compound, an amine solvent, and a sulfur compound. Specific examples include an aliphatic hydrocarbon solvent such as butane, pentane, hexane, heptane, octane, 2,2,4-trimethylpentane, and cyclohexane; an aromatic hydrocarbon solvent such as benzene, toluene, and xylene; a halogenated solvent such as dichloromethane, difluoromethane, chloroform, 1,2-dichloroethane, 1,2-dibromoethane, 1,1,2-trichloro-1,2,2-trifluoroethane, tetrachloroethylene, chlorobenzene, bromobenzene, and an o-dichlorobenzene; an ether solvent such as dimethyl ether, diethyl ether, diisopropyl ether, di-n-butyl ether, methyl-tert-butyl-ether, anisole, 1,4-dioxane, 1,2-dimethoxyethane, bis(2-methoxyethyl) ether, tetrahydrofuran, and etrahydropyran; an alcohol solvent such as methanol, ethanol, 1-propanol, 2-propanol, 1-butanol, 2-butanol, 2-methyl-1-propanol, 3-methyl-1-butanol, cyclohexanol, benzyl alcohol, ethylene glycol, propylene glycol, 2-methoxyethanol, 2-ethoxyethanol, diethylene glycol, triethylene glycol, and glycerin; a phenol solvent such as phenol, and p-cresol; a carbonyl solvent such as acetone, ethyl methyl ketone, cyclohexanone, acetic acid anhydride, ethyl acetate, butyl acetate, ethyl carbonate, propylene carbonate, N,N-dimethylformamide, N,N-dimethylacetamide, and N-methyl-2-pyrrolidone; a phosphoric acid derivative such as hexamethylphosphoric acid triamide, and phosphoric acid triethyl; a nitrile solvent such as acetonitrile, propionitrile, succinonitrile, and benzonitrile; a nitro compound such as nitromethane, and nitrobenzene; an amine solvent such as pyridine, piperidine, and morpholine; and a sulfur compound such as dimethyl sulfoide, and sulfolane.

It is preferable that use amounts of the component (b2) and the component (b3) per mole of a use amount of the component (b1) satisfy the following relation (II).

$$|\text{Valence of } M^3\text{-mole amount of component } (b2) - 2 \times \text{mole amount of component } (b3)| \leq 1 \quad (II)$$

Further, a use amount of the component (b2) per mole of a use amount of the component (b1) is preferably 0.01 to 1.99 mol, more preferably 0.1 to 1.8 mol, further preferably 0.2 to 1.5 mol, most preferably 0.3 to 1 mol. A preferable use amount, a more preferable use amount, a further preferable use amount, and a most preferable use amount of the component (b3) per mole of a use amount of the component (b1) are calculated by the valence of $M^3$, a use amount of the component (b2) per mole of a use amount of the component (b1), and the relation (II) respectively.

Use amounts of the component (b1) and the component (b2) are such amounts that a metal atom derived from the component (b1) contained in the component (B) is preferably 0.1 mmol or more, more preferably 0.5 to 20 mmol, expressed by the molar number of the metal atom contained per gram of the component (B).

In order to progress a reaction more rapidly, after the aforementioned contact, a heating step at a higher temperature may be added. In the heating step, in order to realize a higher temperature, it is preferable to use a solvent having a high boiling point and, upon implementation of the heating step, a solvent for use in contact may be substituted with other solvent having a higher boiling point.

In the component (B), as a result of such a contact, the component (b1), the component (b2) and/or the component (b3) which are a raw material may remain as an unreacted substance, but it is preferable to perform washing treatment of removing an unreacted substance in advance. A solvent thereupon may be the same as, or different from the solvent at contact. It is preferable that such a washing treatment be performed under the inert gas atmosphere. A contact temperature is usually −100 to 300° C., preferably −80 to 200° C. A contact time is usually 1 minute to 200 hours, preferably 10 minutes to 100 hours.

In addition, it is preferable that, after such a contact and washing treatment, a solvent be distilled off from a product and, thereafter, drying be performed at a temperature of 0° C. or higher for 1 hour to 24 hours under reduced pressure. More preferable is 1 hour to 24 hours at a temperature of 0° C. to 200° C., further preferable is 1 hour to 24 hours at a temperature of 10° C. to 200° C., particularly preferable is 2 hours to 18 hours at a temperature of 10° C. to 160° C., and most preferable is 4 hours to 18 hours at a temperature of 15° C. to 160° C.

The component (B) is preferably a solid catalyst component formed by bringing the above component (b1), the above component (b2), the above component (b3) and the following component (b4) into contact with each other.

(b4): granular carrier

As the granular carrier of the component (b4), a solid substance which is insoluble in a solvent for preparing a polymerization catalyst or a polymerization solvent is suitably used, and a porous substance is more suitably used. A role of the granular carrier is described, for example, in "Catalyst Chemistry Applied Chemistry Series 6" etc.

It is preferable that the granular carrier of the component (b4) be of a uniform particle diameter, and a geometrical standard deviation based on a volume of a particle diameter of the granular carrier of the component (b4) is preferably 2.5 or less, more preferably 2.0 or less, further preferably 1.7 or less.

An average particle diameter of the granular carrier of the component (b4) is usually 1 to 5000 μm, preferably 5 to 1000 μm, more preferably 10 to 500 μm, further preferably 10 to 100 μm. A pore volume is preferably 0.1 ml/g or more, more preferably 0.3 to 10 ml/g. A specific surface area is preferably 10 to 1000 m²/g, more preferably 100 to 500 m²/g.

As the porous substance of the granular carrier of the component (b4), an inorganic substance or an organic polymer is suitably used, and the inorganic substance is more suitably used.

Examples of the inorganic substance include an inorganic oxide, a clay, a clay mineral, etc. Alternatively, a plurality of them may be used by mixing them.

Examples of the inorganic oxide include $SiO_2$, $Al_2O_3$, $MgO$, $ZrO_2$, $TiO_2$, $B_2O_3$, $CaO$, $ZnO$, $BaO$, $ThO_2$, $SiO_2$—$MgO$, $SiO_2$—$Al_2O_3$, $SiO_2$—$TiO_2$, $SiO_2$—$V_2O_5$, $SiO_2$—$Cr_2O_3$, $SiO_2$—$TiO_2$—$MgO$, as well as a mixture of two or more kinds of them. Among these inorganic oxides, $SiO_2$ and/or $Al_2O_3$ are preferable, and $SiO_2$ (silica) is particularly preferable. In addition, the inorganic oxides may contain a small amount of carbonate, sulfate, nitrate, and oxide components such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$, and $Li_2O$.

Usually, a hydroxy group is produced, and it is present on a surface of the inorganic oxide. As the inorganic oxide, an improved inorganic oxide in which active hydrogen of a surface hydroxy group is substituted with a variety of substituents may be used. Examples of the improved inorganic oxide include inorganic oxides which have been brought into contact with trialkylchlorosilane such as trimethylchlorosilane, and tert-butyldimethylchlorosilane; triarylchlorosilane such as triphenylchlorosilane; dialkyldichlorosilane such as dimethyldichlorosilane; diaryldichlorosilane such as diphenyldichlorosilane; alkyltrichlorosilane such as methyltrichlorosilane; aryltrichlorosilane such as phenyltrichlorosilane; trialkylalkoxysilane such as trimethylmethoxysilane; triarylalkoxysilane such as triphenylmethoxysilane; dialkyldialkoxysilane such as dimethyldimethoxysilane; diaryldialkoxysilane such as diphenyldimethoxysilane; alkyltrialkoxysilane such as methyltrimethoxysilane; aryltrialkoxysilane such as phenyltrimethoxysilane; tetraalkoxysilane such as tetramethoxysilane; alkyldisilazane such as 1,1,1,3,3,3-hexamethyldisilazane; tetrachlorosilane; alcohol such as methanol, and ethanol; phenol; dialkylmagnesium such as dibutylmagnesium, butylethylmagnesium, and butyloctylmagnesium; alkyllithium such as butyllithium; etc., and inorganic oxides which have been brought into contact with dialkylamine such as diethylamine,and diphenylamine, alcohol such as methanol and ethanol, or phenol after contact with trialkylaluminum.

In the inorganic oxide, a strength of the inorganic oxide has been enhanced by hydrogen-bonding between hydroxy groups, in some cases. In that case, if all of active hydrogens of a surface hydroxy group have been substituted with a variety of substituents, this leads to reduction in a particle strength, etc., in some cases. Therefore, it is not required that all of active hydrogens of a surface hydroxy group of the inorganic oxide are necessarily substituted, and a substitution rate of a surface hydroxy group may be appropriately determined. A method of changing a substitution rate of a surface hydroxy group is not particularly limited. Examples of the method include a method of changing a use amount of a compound to be used for contact.

Examples of the clay or the clay mineral include kaolin, bentonite, kibushi clay, gairome clay, allophone, hisingerite, pyrophyllite, talc, mica group, smectite, montmorillonite group, hectorite, laponite, saponite, vermiculite, chlorite group, palygorskite, kaolinite, nacrite, dickite, and halloysite. Among them, preferable is smectite, montmorillonite, hectorite, laponite, or saponite, and further preferable is montmorillonite or hectorite.

As the inorganic substance, an inorganic oxide is suitably used. It is preferable that the inorganic substance have been dried, and a moisture have been substantially removed therefrom, and the inorganic substance which has been dried by heat-treatment is preferable. Heat-treatment is usually performed on the inorganic substance in which a moisture cannot be confirmed visually, at a temperature of 100 to 1,500° C., preferably 100 to 1,000° C., further preferably 200 to 800° C. A heating time is preferably 10 minutes to 50 hours, more preferably 1 hour to 30 hours. Examples of the method of heat-drying include a method of drying by flowing a dried inert gas (e.g. nitrogen or argon) at a constant flow rate during heating, a method of heating and reducing a pressure under reduced pressure, etc.

As the organic polymer, a polymer having a functional group having active hydrogen or a non-proton donating Lewis basic functional group is preferable.

Examples of the functional group having active hydrogen include a primary amino group, a secondary amino group, an imino group, an amido group, a hydazido group, an amidino group, a hydroxy group, a hydroperoxy group, a carboxyl group, a formyl group, a carbamoyl group, a sulfonic acid group, a sulfinic acid group, a sulfenic acid group, a thiol group, a thioformyl group, a pyrrolyl group, an imidazolyl group, a piperidyl group, an indazolyl group, a carbazolyl group, etc. It is preferably a primary amino group, a secondary amino group, an imino group, an amido group, an imido group, a hydroxy group, a formyl group, a carboxyl group, a sulfonic acid group, or a thiol group. Particulalry preferably a primary amino group, a secondary amino group, an amido group, or a hydroxy group. In addition, these groups may be substituted with a halogen atom, or a hydrocarbyl group having 1 to 20 carbon atoms.

The non-proton donating Lewis basic functional group is a functional group having a Lewis base part not having an active hydrogen atom, and examples include a pyridyl group, a N-substituted imidazolyl group, a N-substituted indazolyl group, a nitrile group, an azido group, a N-substituted imino group, a N,N-substituted amino group, a N,N-substituted aminooxy group, a N,N,N-substituted hydrazino group, a nitroso group, a nitro group, a nitrooxy group, a furyl group, a carbonyl group, a thiocarbonyl group, an alkoxy group, an alkyloxycarbonyl group, a N,N-substituted carbamoyl group, a thioalkoxy group, a substituted sulfinyl group, a substituted sulfonyl group, a substituted sulfonic acid group, etc. It is preferably a heterocyclic group, and further preferably an aromatic heterocyclic group having an oxygen atom and/or a nitrogen atom in a ring. It is particularly preferably a pyridyl group, a N-substituted imidazolyl group, or a N-substituted indazolyl group, and most preferably a pyridyl group. In addition, these groups may be substituted with a halogen atom, or a hydrocarbyl group having 1 to 20 carbon atoms.

In the organic polymer, the content of the functional having active hydrogen or the non-proton donating Lewis basic functional group is preferably 0.01 to 50 mmol/g, more preferably 0.1 to 20 mmol/g, expressed by the mole amount of the functional group per gram of the polymer unit constituting the organic polymer.

Examples of a method for producing a polymer having the functional group having active hydrogen or the non-proton donating Lewis basic functional group include a method of homo-polymerizing a monomer having the functional group having active hydrogen or the non-proton donating Lewis basic functional group and one or more polymerizable unsaturated groups, and a method of copolymerizing the monomer and other monomer having a polymerizable unsaturated group. Thereupon, it is preferable to further copolymerize a crosslinking polymerizable monomer having two or more polymerizable unsaturated groups together.

Examples of the polymerizable unsaturated group include an alkenyl group such as a vinyl group, and an allyl group; an alkynyl group such as an ethyne group; etc.

Examples of the monomer having the functional group having active hydrogen and one or more polymerizable unsaturated groups include vinyl group-containing primary amine, vinyl group-containing secondary amine, a vinyl group-containing amide compound, a vinyl group-containing hydroxy compound, etc. Specific examples of the monomer include N-(1-ethenyl)amine, N-(2-propenyl)amine, N-(1-ethenyl)-N-methylamine, N-(2-propenyl)-N-methylamine, 1-ethenylamide, 2-propenylamide, N-methyl-(1-ethenyl)amide, N-methyl-(2-propenyl)amide, vinyl alcohol, 2-propen-1-ol, 3-buten-1-ol, etc.

Examples of the monomer having the functional group having a Lewis base part not having an active hydrogen atom and one or more polymerizable unsaturated groups include vinylpyridine, vinyl(N-substituted)imidazole, vinyl(N-substituted)indazole, etc.

Examples of other monomer having a polymerizable unsaturated group include ethylene, an α-olefin, an aromatic vinyl compound, a cyclic olefin, etc. A specific example of the monomer is ethylene, propylene, 1-butene, 1-hexene, 4-methyl-1-pentene, styrene, norbornene, or dicyclopentadiene. Two or more kinds of these monomers may be used. Preferable is ethylene or styrene. In addition, examples of the crosslinking polymerizable monomer having two or more polymerizable unsaturated groups include divinylbenzene, etc.

It is preferable that the organic polymer have been dried and a moisture have been substantially removed therefrom, and the organic polymer which has been dried by heat-treatment is preferable. Heat-treatment is usually performed on the organic polymer in which a moisture cannot be confirmed visually, at a temperature of 30 to 400° C., preferably 50 to 200° C., further preferably 70 to 150° C. A heating time is preferably 10 minutes to 50 hours, more preferably 1 hour to 30 hours. Examples of the method of heat-drying include a method of drying by flowing a dried inert gas (e.g. nitrogen or argon) at a constant flow rate during heating, a method of heat-drying under reduced pressure, etc.

When as the component (B), a solid catalyst component formed by bringing the component (b1), the component (b2), the component (b3), and the component (b4) in contact with each other is used, examples of an order of bringing the component (b1), the component (b2), the component (b3), and the component (b4) into contact with each other include the following orders.

<1> The component (b1) and the component (b2) are brought into contact with each other, the contact product derived from the contact is brought into contact with the component (b3), and the contact product derived from the contact is brought into contact with the component (b4).
<2> The component (b1) and the component (b2) are brought into contact with each other, the contact product derived from the contact is brought into contact with the component (b4), and the contact product derived from the contact is brought into contact with the component (b3).
<3> The component (b1) and the component (b3) are brought into contact with each other, the contact product derived from the contact is brought into contact with the component (b2), and the contact product derived from the contact is brought into contact with the component (b4).
<4> The component (b1) and the component (b3) are brought into contact with each other, the contact product derived from the contact is brought into contact with the component (b4), and the contact product derived from the contact is brought into contact with the component (b2).
<5> The component (b1) and the component (b4) are brought into contact with each other, the contact product derived from the contact is brought into contact with the component (b2), and the contact product derived from the contact is brought into contact with the component (b3).
<6> The component (b1) and the component (b4) are brought into contact with each other, the contact product derived from the contact is brought into contact with the component (b3), and the contact product derived from the contact is brought into contact with the component (b2).
<7> The component (b2) and the component (b3) are brought into contact with each other, the contact product derived from the contact is brought into contact with the component (b1), and the contact product derived from the contact is brought into contact with the component (b4).
<8> The component (b2) and the component (b3) are brought into contact with each other, the contact product derived from the contact is brought into contact with the component (b4), and the contact product derived from the contact is brought into contact with the component (b1).
<9> The component (b2) and the component (b4) are brought into contact with each other, the contact product derived from the contact is brought into contact with the component (b1), and the contact product derived from the contact is brought into contact with the component (b3).
<10> The component (b2) and the component (b4) are brought into contact with each other, the contact product derived from the contact is brought into contact with the component (b3), and the contact product derived from the contact is brought into contact with the component (b1).
<11> The component (b3) and the component (b4) are brought into contact with each other, the contact product derived from the contact is brought into contact with the component (b1), and the contact product derived from the contact is brought into contact with the component (b2).
<12> The component (b3) and the component (b4) are brought into contact with each other, the contact product derived from the contact is brought into contact with the component (b2), and the contact product derived from the contact is brought into contact with the component (b1).

It is preferable that contact between the component (b1), the component (b2), the component (b3), and the component (b4) be performed under the inert gas atmosphere. A contact temperature is usually −100 to 300° C., preferably −80 to 200° C. A contact time is usually 1 minute to 200 hours, preferably 10 minutes to 100 hours. A solvent may be used for contact, or these compounds may be directly brought into contact with each other without using a solvent.

When a solvent is used, the solvent which does not react with the component (b1), the component (b2), the component (b3), and the component (b4), and the contact product thereof is used. However, as described above, when respective components are brought into contact with each other step-wisely, even a solvent which reacts with a certain component at a certain stage, but does not react with respective components at other stage can be used at other stage. That is, solvents at respective stages are the same as, or different from one another. Examples of the solvent include a nonpolar solvent such as an aliphatic hydrocarbon solvent, and an aromatic hydrocarbon solvent; a polar solvent such as a halogenated solvent, an ether solvent, an alcohol solvent, a phenol solvent, a carbonyl solvent, a phosphoric acid derivative, a nitrile solvent, a nitro compound, an amine solvent, and a sulfur compound. Specific examples include an aliphatic hydrocarbon solvent such as butane, pentane, hexane, heptane, octane, 2,2,4-trimethylpentane, and cyclohexane; an aromatic hydrocarbon solvent such as benzene, toluene, and xylene; a halogenated solvent such as dichloromethane, difluoromethane, chloroform, 1,2-dichloroethane, 1,2-dibromoethane, 1,1,2-trichloro-1,2,2-trifluoroethane, tetrachloroethylene, chlorobenzene, bromobenzene, and an o-dichlorobenzene; an ether solvent such as dimethyl ether, diethyl ether, diisopropyl ether, di-n-butyl ether, methyl-tert-butyl-ether, anisole, 1,4-dioxane, 1,2-dimethoxyethane, bis(2-methoxyethyl) ether, tetrahydrofuran, and etrahydropyran; an alcohol solvent such as methanol, ethanol, 1-propanol, 2-propanol, 1-butanol, 2-butanol, 2-methyl-1-propanol, 3-methyl-1-butanol, cyclohexanol, benzyl alcohol, ethylene glycol, propylene glycol, 2-methoxyethanol, 2-ethoxyethanol, diethylene glycol, triethylene glycol, and glycerin; a phenol solvent such as phenol, and p-cresol; a carbonyl solvent such as acetone, ethyl methyl ketone, cyclohexanone, acetic acid anhydride, ethyl acetate, butyl acetate, ethyl carbonate, propylene carbonate, N,N-dimethylformamide, N,N-dimethylacetamide, and N-methyl-2-pyrrolidone; a phosphoric acid derivative such as hexamethylphosphoric acid triamide, and phosphoric acid triethyl; a nitrile solvent such as acetonitrile, propionitrile, succinonitrile, and benzonitrile; a nitro compound such as nitromethane, and nitrobenzene; an amine solvent such as pyridine, piperidine, and morpholine; and a sulfur compound such as dimethyl sulfoide, and sulfolane.

When the contact product (c) obtained by bringing the component (b1), the component (b2) and the component (b3) into contact with each other is brought into contact with the component (b4), that is, in each method of the <1>, <3> and <7>, as a solvent (s1) to be used when the contact product (c) is produced, the aliphatic hydrocarbon solvent, the aromatic hydrocarbon solvent or the ether solvent is preferable.

On the other hand, as a solvent (s2) to be used when the contact product (c) and the component (b4) are brought into contact with each other, a polar solvent is preferable. As an index expressing polarity of the solvent, an $E_T^N$ (C. Reichardt, "Solvents and Solvents Effects in Organic Chemistry", $2^{nd}$ ed., VCH Verlag (1988).) etc. are know, and the solvent satisfying a range of $0.8 \geq E_T^N \geq 0.1$ is particularly preferable.

Examples of such a polar solvent include dichloromethane, dichlorodifluoromethane, chloroform, 1,2-dichloroethane, 1,2-dibromoethane, 1,1,2-trichloro-1,2,2-trifluoroethane, tetrachloroethylene, chlorobenzene, bromobenzene, o-dichlorobenzene, dimethyl ether, diethyl ether, diisopropyl ether, di-n-butyl ether, methyl-tert-butyl ether, anisole, 1,4-dioxane, 1,2-dimethoxyethane, bis(2-methoxyethyl)ether, tetrahydrofuran, tetrahydropyran, methanol, ethanol, 1-propanol, 2-propanol, 1-butanol, 2-butanol, 2-methyl-1-propanol, 3-methyl-1-butanol, cyclohexanol, benzyl alcohol, ethylene glycol, propylene glycol, 2-methoxyethanol, 2-ethoxyethanol, diethylene glycol, triethylene glycol, acetone, ethyl methyl ketone, cyclohexanone, acetic acid anhydride, ethyl acetate, butyl acetate, ethyl carbonate, propylene carbonate, N,N-dimethylformamide, N,N-dimethylacetamide, N-methyl-2-pyrrolidone, hexamehylphosphoric acid triamide, phosphoric acid triethyl, acetonitrile, propionitrile, succinonitrile, benzonitrile, nitromethane, nitrobenzene, ethylenediamine, pyridine, piperidine, morpholine, dimethyl sulfoxide, sulfolane, etc.

The solvent (s2) is further preferably dimethyl ether, diethyl ether, diisopropyl ether, di-n-butyl ether, methyl-tert-butyl ether, anisole, 1,4-dioxane, 1,2-dimethoxyethane, bis(2-methoxyethyl)ether, tetrahydrofuran, tetrahydropyran, methanol, ethanol, 1-propanol, 2-propanol, 1-butanol, 2-butanol, 2-methyl-1-propanol, 3-methyl-1-butanol, cyclohexanol, benzyl alcohol, ethylene glycol, propylene glycol, 2-methoyethanol, 2-ethoxyethanol, diethylene glycol, or triethylene glycol, particularly preferable di-n-butyl ether, methyl-tert-butyl ether, 1,4-dioxane, tetrahydrofuran, methanol, ethanol, 1-propanol, 2-propanol, 1-butanol, 2-butanol, 2-methyl-1-propanol, 3-methyl-1-butanol, or cyclohexanol, most preferably tetrahydrofuran, methanol, ethanol, 1-propanol, or 2-propanol.

As the solvent (s2), a mixed solvent of these polar solvents and a hydrocarbon solvent can be used. As the hydrocarbon solvent, compounds exemplified as the aliphatic hydrocarbon solvent and the aromatic hydrocarbon solvent are used. Examples of the mixed solvent of a polar solvent and a hydrocarbon solvent include a hexane/methanol mixed solvent, a hexane/ethanol mixed solvent, a hexane/1-propanol mixed solvent, a hexane/2-propanol mixed solvent, a heptane/methanol mixed solvent, a heptane/ethanol mixed solvent, a heptane/1-propanol mixed solvent, a heptane/2-propanol mixed solvent, a toluene/methanol mixed solvent, a toluene/ethanol mixed solvent, a toluene/1-propanol mixed solvent, a toluene/2-propanol mixed solvent, a xylene/methanol mixed solvent, a xylene/ethanol mixed solvent, a xylene/1-propanol mixed solvent, and a xylene/2-propanol mixed solvent. Preferable is a hexane/methanol mixed solvent, a hexane/ethanol mixed solvent, a heptane/methanol mixed solvent, a heptane/ethanol mixed solvent, a tolene/methanol mixed solvent, a toluene/ethanol mixed solvent, a xylene/methanol mixed solvent, or a xylene/ethanol mixed solvent. Further preferable is a hexane/methanol mixed solvent, a hexane/ethanol mixed solvent, a toluene/methanol mixed solvent, or a toluene/ethanol mixed solvent. Most preferable is a toluene/ethanol mixed solvent. In addition, a preferable range of an ethanol fraction in a toluene/ethanol mixed solvent is 10 to 50% by volume, further preferably 15 to 30% by volume.

When the contact product (c) formed by bringing the component (b1), the component (b2) and the component (b3) into contact with each other is brought into contact with the component (b4), that is, in each method of the <1>, <3> and <7>, as the solvent (s1) and the solvent (s2), a hydrocarbon solvent can be also used as both solvents. In this case, a time until the resulting contact product (c) and the component (b4) are brought into contact with each other after the component (b1), the component (b2) and the component (b3) are brought into contact with each other is preferably shorter. A time is preferably 0 to 5 hours, further preferably 0 to 3 hours, most preferably 0 to 1 hour. In addition, a temperature for contacting the contact product (c) and the component (b4) is usually −100° C. to 40° C., preferably −20° C. to 20° C., most preferably −10° C. to 10° C.

In the case of the <2>, <5>, <6>, <8>, <9>, <10>, <11>, or <12>, all of the aforementioned nonpolar solvents and polar solvents can be used. Preferable is a nonpolar solvent. This is because the contact product of the component (b1) and the component (b3), or the contact product derived from contact between the contact product of the component (b1) and the component (b2), and the component (b3) has generally low solubility in a nonpolar solvent, therefore, when the component (b4) is present in a reaction system at production of these contact products, it is thought that the contact product is precipitated on a surface of the component (b4), and is more easily solidified.

In order to progress a reaction more rapidly, after the aforementioned contact, a heating step at a higher temperature may be added. In the heating step, in order to realize a higher temperature, it is preferable to use a solvent having a high boiling point and, upon implementation of the heating step, a solvent for use in contact may be replaced with other solvent having a higher boiling point.

In the component (B), as a result of such a contact, the component (b1), the component (b2), the component (b3) and/or the component (b4) which are a raw material may remain as an unreacted substance, but it is preferable to perform washing treatment of removing an unreacted substance in advance. A solvent thereupon may be the same as, or different from the solvent at contact. It is preferable that such a washing treatment be performed under the inert gas atmosphere. A contact temperature is usually −100 to 300° C., preferably −80 to 200° C. A contact time is usually 1 minute to 200 hours, preferably 10 minutes to 100 hours.

In addition, it is preferable that, after such a contact and washing treatment, a solvent be distilled off from a product and, thereafter, drying be performed at a temperature of 0° C. or higher for 1 hour to 24 hours under reduced pressure. More preferable is 1 hour to 24 hours at a temperature of 0° C. to 200° C., further preferable is 1 hour to 24 hours at a temperature of 10° C. to 200° C., particularly preferable is 2 hours to 18 hours at a temperature of 10° C. to 160° C., and most preferable is 4 hours to 18 hours at a temperature of 15° C. to 160° C.

Examples of the organoaluminum compound of the component (C) include trialkylaluminum, dialkylaluminum chloride, alkylaluminum dichloride, dialkylaluminum hydride, alkyl(dialkoxy)aluminum, dialkyl(alkoxy)aluminum, alkyl(diaryloxy)aluminum, dialkyl(aryloxy)aluminum, etc.

Examples of the trialkylaluminum include trimethylaluminum, triethylaluminum, tri-n-propylaluminum, tri-n-butylaluminum, triisobutylaluminum, tri-n-hexylaluminum, tri-n-octylaluminum, etc., examples of the dialkylaluminum chloride include dimethylaluminum chloride, diethylaluminum chloride, di-n-propylaluminum chloride, di-n-butylaluminum chloride, diisobutylaluminum chloride, di-n-hexylaluminum chloride, etc., examples of the alkylaluminum dichloride include methylaluminum dichloride, ethylaluminum dichloride, n-propylaluminum dichloride, n-butylaluminum dichloride, isobutylaluminum dichloride, n-hexylaluminum dichloride, etc., examples of the dialkylaluminum hydride include dimethylaluminum hydride, diethylaluminum hydride, di-n-propylaluminum hydride, di-n-butylaluminum hydride, diisobutylaluminum hydride, di-n-hexylaluminum hydride, etc., examples of the alkyl(dialkoxy)aluminum include methyl(dimethoxy)aluminum, methyl(diethoxy)aluminum, methyl(di-tert-butoxy)aluminum, etc., examples of the dialkyl(alkoxy)aluminum include dimethyl(methoxy)aluminum, dimethyl(ethoxy)aluminum, methyl(tert-butoxy)aluminum, etc., examples of the alkyl(diaryloxy)aluminum include methyl(diphenoxy)aluminum, methylbis(2,6-diisopropylphenoxy)aluminum, methylbis(2,6-diphenylphenoxy)aluminum, etc., and examples of the dialkyl(aryloxy)aluminum include dimethyl(phenoxy)aluminum, dimethyl(2,6-diisopropylphenoxy)aluminum, dimethyl(2,6-diphenylphenoxy)aluminum, etc.

Only one kind of these organoaluminum compounds may be used, or two or more kinds may be used by combining them.

The organoaluminum compound is preferably trialkylaluminum, more preferably trimethylaluminum, triethylaluminum, tri-n-butylaluminum, triisobutylaluminum, tri-n-hexylaluminum, or tri-n-octylaluminum, further preferably triisobutylaluminum, or tri-n-octylaluminum.

The catalyst for copolymerization of ethylene with an α-olefin to be used in production of the ethylene-α-olefin copolymer of the present invention is a catalsyt for copolymerization of ethylene with an α-olefin, which is formed by bringing the component (A1), the component (A2), the component (B) and the component (C) into contact with S23580 each other and, in the contact, the molar ratio ((A1)/(A2)) of the component (A1) to the component (A2) is 1 to 90, and the amount of contact between the component (B) and the component (C) is arbitrary.

In contact between the component (A1), the component (A2), the component (B) and the component (C), the molar ratio ((A1)/(A2)) of the component (A1) to the component (A2) is preferably 5 to 80, more preferably 10 to 70, further preferably 20 to 70, particularly preferably 30 to 70.

The total use amount of the component (A1) and the component (A2) is preferably 1 to 10000 μmol/g, more preferably 10 to 1000 μmol/g, further preferably 20 to 500 μmol/g, per gram of the component (B).

The use amount of the component (C) is preferably 0.1 to 1000, more preferably 0.5 to 500, further preferably 1 to 100, expressed by the molar number of an aluminum atom of the organoaluminum compound per mole of the total molar number of the component (A1) and the component (A2).

In addition, in preparation of a catalyst for polymerization, an electron donating compound (component (D)) may be contacted, in addition to the component (A1), the component (A2), the component (B) and the component (C). The use amount of the electron donating compound is preferably 0.01 to 100, more preferably 0.1 to 50, further preferably 0.25 to 5, expressed by the molar number of the electron donating compound per mole of the total molar number of the component (A1) and the component (A2).

Examples of the electron donating compound include triethylamine, and trinormaloctylamine.

It is preferable that contact between the component (A1), the component (A2), the component (B) and the component (C) and, if necessary, the component (D) be performed under the inert gas atmosphere. A contact temperature is usually −100 to 300° C., preferably −80 to 200° C. A contact time is usually 1 minute to 200 hours, preferably 30 minutes to 100 hours. Further, respective components are fed into a polymerization reaction tank separately, and contact may be performed in a polymerization reactor.

The ethylene-α-olefin copolymer of the present invention is obtained by copolymerizing ethylene with an α-olefin in the presence of the catalsyt for copolymerization of ethylene with an α-olefin.

Examples of a polymerization method include a vapor polymerization method, a slurry polymerization method, and a bulk polymerization method. Preferable is a vapor polymerization method, and more preferable is a continuous vapor polymerization method. A vapor polymerization reaction apparatus to be used in the polymerization method is usually an apparatus having a fluidized bed-type reaction tank, preferably an apparatus having a fluidized bed-type reaction tank having an extension part. A stirring wing may be arranged in a reaction tank.

As a method of supplying a catalyst for polymerization, and each catalyst component to a polymerization reaction tank, usually, a method of supplying them in the state where there is no moisture, using an inert gas such as nitrogen, and argon, hydrogen, ethylene, etc., or a method of dissolving or diluting each component in a solvent, and supplying them in the solution or slurry state is used.

When ethylene and an α-olefin are vapor-polymerized, a polymerization temperature is usually lower than a temperature at which an ethylene-α-olefin copolymer produced by polymerization is melted, preferably 0 to 150° C., more preferably 30 to 100° C. An inert gas may be introduced, or hydrogen as a molecular weight regulating agent may be introduced into a polymerization reaction tank. Alternatively, an organoaluminum compound or an electron donating compound may be introduced.

Upon production of the ethylene-α-olefin polymer of the present invention, a method of polymerizing ethylene and an α-olefin using, as a polymerization catalyst component or a polymerization catalyst, a prepolymerization solid component obtained by polymerizing (hereinafter, referred to as prepolymerization) a small amount of ethylene and an α-olefin using the component (A1), the component (A2), the component (B) and the component (C) and, if necessary, an electron donating compound is preferable.

Examples of the olefin to be used in prepolymerization include ethylene, propylene, 1-butene, 1-pentene, 1-hexene, 1-octene, 4-methyl-1-pentene, cyclopentene, cyclohexene, etc. One kind of them may be used, or two or more kinds may be used by combining them. Preferably, only ethylene is used, or ethylene is used together with an α-olefin, further preferably, only ethylene is used, or ethylene is used together with at least one kind α-olefin selected from 1-butene, 1-hexene and 1-octene.

The content of a preliminarily polymerized polymer in a prepolymerization solid component is preferably 0.01 to 1,000 g, more preferably 0.05 to 500 g, further preferably 0.1 to 200 g per gram of the component (B).

The prepolymerization method may be a continuous polymerization method or a batch polymerization method, and is for example a batch slurry polymerization method, a continuous slurry polymerization method, or a continuous vapor polymerization method. As a method of feeding the component (A1), the component (A2), the component (B), and the component (C) and, if necessary, the electron donating compound into a polymerization reaction tank in which prepolymerization is performed, usually, a method of feeding them in the state where there is no moisture, using an inert gas such as nitrogen, and argon, hydrogen, ethylene, etc., or a method of dissolving or diluting each component in a solvent, and feeding them in the solution or slurry state is used.

When prepolymerization is performed by a slurry polymerization method, as a solvent, a saturated hydrocarbon compound is usually used, and examples include propane, normalbutane, isobutane, normalpentane, isopentane, normalhexane, cyclohexane, heptane, etc. These are used alone, or two or more kinds are used by combining them. As the saturated hydrocarbon compound, a hydrocarbon compound having a boiling point at an ordinary pressure of 100° C. or lower is preferable, a hydrocarbon compound having a boiling point at an ordinary pressure of 90° C. or lower is more preferable, and propane, normalbutane, isobutane, normalpentane, isopentane, normalhexane, and cyclohexane are further preferable.

When prepolymerization is performed by a slurry polymerization method, as a slurry concentration, an amount of the component (B) per liter of a solvent is usually 0.1 to 600 g, preferably 0.5 to 300 g. A prepolymerization temperature is usually −20 to 100° C., preferably 0 to 80° C. During prepolymerization, a polymerization temperature may be appropriately changed, and a temperature at which prepolymerization is initiated, is preferably 45° C. or lower, preferably 40° C. or lower. In addition, a partial pressure of olefins at a vapor part during prepolymerization is usually 0.001 to 2 MPa, preferably 0.01 to 1 MPa. A prepolymerization time is usually 2 minutes to 15 hours.

As a method of supplying a preliminarily polymerized prepolymerization solid catalyst component to a polymerization reaction tank, usually, a method of supplying it in the state where there is no moisture, using an inert gas such as nitrogen, and argon, hydrogen, ethylene, etc., or a method of dissolving or diluting each component in a solvent, and supplying it in the solution or slurry state is used.

The ethylene-α-olefin copolymer of the present invention may contain the known additive as necessary. Examples of the additive include antioxidants, weather resistant agents, lubricants, anti-blocking agents, antistatic agents, antifog agents, no-drip agents, pigments, fillers, etc.

The ethylene-α-olefin copolymer of the present invention can be also prepared into a thermoplastic resin composition by blending with a thermoplastic resin other than the ethylene-α-olefin copolymer of the present invention. Examples of other thermoplastic resin include a crystallizable thermoplastic resin such as polyolefin, polyamide, polyester, and polyacetal, a noncrystallizable thermoplastic resin such as polystyrene, acrylonitrile•butadiene•styrene copolymer (ABS), polycarbonate, polyphenylene oxide, and polyacrylate, polyvinyl chloride, etc.

Examples of the polyolefin include polyethylene, polypropylene, polybutene, poly4-methyl-1-pentene, poly3-methyl-1-butene, polyhexene, etc.

Examples of the polyamide include an aliphatic amide such as nylon-6, nylon-66, nylon-10, nylon-12, and nylon 46, an aromatic polyamide produced from aromatic dicarboxylic acid and aliphatic diamine, etc.

Examples of the polyester include aromatic polyester such as polyethylene terephthalate, polyethylene naphthalate, and polybutylene terephthalate, polycaprolactone, polyhydroxybutyrate, etc.

Examples of the polyacetal include polyformaldehyde (polyoxymethylene), polyacetaldehyde, polypropionaldehyde, polybutylaldehyde, etc.

The polystyrene may be a homopolymer of styrene, or a binary copolymer of styrene and acrylonitrile, methyl methacryate, or α-methylstyrene.

As ABS, ABS containing constituent units derived from acrylonitrile at an amount of 20 to 35 mol %, containing constituent units derived from butadiene at an amount of 20 to 30 mol %, and containing constituent units derived from styrene at an amount of 40 to 60 mol % is preferably used.

Examples of the polycarbonate include polymers obtained from bis(4-hydroxyphenyl)methane, 1,1-bis(4-hydroxyphenyl)ethane, 2,2-bis(4-hydroxyphenyl)propane, 2,2-bis(4-hydroxyphenyl)propane, 2,2-bis(4-hydroxyphenyl)butane, etc.

Examples of the polyphenylene oxide include poly(2,6-dimethyl-1,4-phenylene oxide), etc.

Examples of the polyacrylate include polymethyl methacrylate, polybutyl acrylate, etc.

In the ethylene-α-olefin copolymer of the present invention, the known molding processing method, for example, an extruding such as an blown film process, a flat die process, and a process for producing a lamination film, an injection molding method, a compression molding method, etc., is used, and an extruding is suitably used.

The ethylene-α-olefin copolymer of the present invention is used by molding into a variety of forms. A form of an article is not particularly limited, but the article is used in films, sheets, or containers (trays, bottles, etc.). The article is also suitably used in utilities such as food packaging materials; medicament packaging materials; electron parts packaging materials used for packaging semiconductor products; surface protective materials.

EXAMPLES

The present invention will be explained below by way of Examples.

Physical properties in Examples and Comparative Examples were measured according to the following methods.

(1) Density (d, unit: Kg/m$^3$)

Density was measured according to the method defined in the A method, among JIS K7112-1980. A sample was subjected to annealing described in JIS K6760-1995.

(2) Short chain branch number ($N_{SCB}$, unit: 1/1000 C)

Using an infrared photospectrometer (FT-IR7300 manufactured by JASCO Corporation), and using a calibration line, a short chain branch number ($N_{SCB}$) per 1000 carbon atoms was obtained from characteristic absorption of ethylene and an α-olefin. This $N_{SCB}$ value represents the content of monomer units derived from an α-olefin in a copolymer of ethylene and an α-olefin.

(3) Melt Flow Rate (MFR, unit: g/10 min)

Melt flow rate was measured by the A method under the conditions of a load of 21.18 N and a temperature of 190° C., in the method defined in JIS K7210-1995.

(4) Swell Ratio (SR)

A strand of an ethylene-α-olefin copolymer extruded at a length of around 15 to 20 mm from an orifice under the conditions of a temperature of 190° C. and a load of 21.18 N in measurement of the melt flow rate of (3) was cooled in air to obtain a solid strand. Then, a diameter D (unit: mm) of the strand at a position of about 5 mm from an extrusion upstream side tip of the strand was measured, a value (D/DJ obtained by dividing the diameter D by an orifice diameter 2.095 mm ($D_0$) was calculated, and this was adopted as a swell ratio.

(5) Molecular Weight Distribution (Mw/Mn)

A weight average molecular weight (Mw) and a number average molecular weight (Mn) were measured using the gel permeation chromatography (GPC) method under the following conditions (1) to (8), and Mw/Mn was obtained.

A baseline on a chromatograph was a straight line obtained by connecting a point at a stable horizontal region in which a retention time is sufficiently shorter than appearance of a sample elution peak, with a point at a stable horizontal region in which a retention time is sufficiently longer than observance of a solvent elution peak.

(1) Apparatus: Waters 150C manufactured by Waters (2) Separation column: TOSHO TSKgelGMH6-HT (3) Measurement temperature: 140° C.

(4) Carrier: orthodichlorobenzene (5) Flow rate: 1.0 mL/min (6) Injection amount: 500 μL (7) Detector: differential refraction (8) Molecular weight standard substance: standard polystyrene (6) Melt Tension (MT, unit: cN)

Using a melt tension tester manufactured by Toyo Seiki Seisakusho, Ltd., and at a temperature of 190° C. and an extrusion rate of 0.32 g/min, an ethylene-α-olefin copolymer was melt-extruded from an orifice having a diameter of 2.095 mm and a length of 8 mm, the extruded and melted ethylene-α-olefin copolymer was taken up filament-like by a take-up roll at a take-up increasing rate of 6.3 (m/min)/min, and a tensile force upon take-up was measured. A maximum tensile force during from take-up initiation to breakage of a filamentous ethylene-α-olefin copolymer was adopted as melt tension.

(7) g*

By the formula (I), was obtained.

100 mg of an ethylene-α-olefin copolymer was dissolved in 100 ml of tetralin containing 5% by weight of butylhydroxytoluene (BHT) as a thermal degradation preventing agent at 135° C. to prepare a sample solution, and the relative viscosity (ηrel) of an ethylene-μ-olefin copolymer was calculated from dropping times of the sample solution and a blank solution consisting of tetralin containing only 0.5% by weight of BHT as a thermal degradation preventing agent using a Ubbelohde-type viscometer, and [η] was obtained by the formula (I-I), $[\eta]_{GPC}$ was obtained by the formula (I-II) from measurement of a molecular weight distribution of an ethylene-α-olefin copolymer of (5), and $g_{SCH}*$ was obtained by the formula (I-III) from measurement of a short chain branch number of an ethylene-α-olefin copolymer of (2).

(8) Impact Strength (Unit: kJ/m²)

Impact strength was measured according to ASTM D1822-68.

Example 1

(1) Preparation of Solid Catalsyt Component (B)

Into a nitrogen-replaced reactor equipped with a stirrer were fed 2.8 kg of silica (Sylopo1948 manufactured by Debison) which had been heat-treated at 300° C. under nitrogen flowing and 24 kg of toluene, and the mixture was stirred. Thereafter, after cooled to 5° C., a mixed solution of 0.9 kg of 1,1,1,3,3,3-hexamethyldisilazane and 1.4 kg of toluene was added dropwise for 30 minutes while a temperature of the reactor was retained at 5° C. After completion of addition, the mixture was stirred at 5° C. for 1 hour, then, a temperature was raised to 95° C., and this was stirred at 95° C. for 3 hours, and filtered. The resulting solid product was washed with 20.8 kg of toluene six times. Thereafter, 7.1 kg of toluene was added to form a slurry, and the slurry was allowed to stand overnight.

Into the slurry obtained above were fed 1.73 kg of a hexane solution of diethylzinc (diethylzinc concentration: 50% by weight) and 1.02 kg of hexane, and the mixture was stirred. Thereafter, after cooled to 5° C., a mixed solution of 0.78 kg of 3,4,5-trifluorophenol and 1.44 kg of toluene was added dropwise over 60 minutes while a temperature of the reactor was retained at 5° C. After completion of addition, the mixture was stirred at 5° C. for 1 hour, then, the temperature was raised to 40° C., and the mixture was stirred at 40° C. for 1 hour. Thereafter, the materials were cooled to 22° C., and 0.11 kg of $H_2O$ was added dropwise over 1.5 hours while the temperature of the reactor was retained at 22° C. After completion of addition, the mixture was stirred at 22° C. for 1.5 hours, then, the temperature was raised to 40° C., the mixture was stirred at 40° C. for 2 hours, further, the temperature was raised to 80° C., and the mixture was stirred at 80° C. for 2 hours. After stirring, at room temperature, the supernatant was extracted to a remaining amount of 16 L, 11.6 kg of toluene was fed therein, then, a temperature was raised to 95° C., and the mixture was stirred for 4 hours. After stirring, at room temperature, the supernatant was extracted to obtain a solid product. The resulting solid product was washed with 20.8 kg of toluene four times, and 24 L of hexane three times. Thereafter, drying afforded a solid catalyst component (B).

(2) Polymerization

An autoclave equipped with a stirrer having an internal volume of 3 l, which had been replaced with argon after drying under reduced pressure, was evacuated, hydrogen was added so that its partial pressure might become 0.01 MPa, 30 g of 1-butene, and 720 g of butane as a polymerization solvent were fed, and a temperature was raised to 70° C. Thereafter, ethylene was added so that its partial pressure might become 1.6 MPa, and the system was stabilized As a result of gas chromatography analysis, a gas composition in the system was hydrogen=0.36 mol %, and 1-butene=1.58 mol %. Into this 0.9 ml of a hexane solution of isobutylaluminum as an organoaluminum compound (C), the concentration of which had been adjusted to 1 mol/l, was fed. Then, 1.5 ml of toluene solution of dimethylsilanediylbis(cyclopentadienyl)zirconium dichloride [corresponding to composition (A1)], the concentration of which had been adjusted to 10 μmol/ml, and 0.25 ml of a toluene solution of racemic-ethylenebis(1-indenyl)zirconium diphenoxide [corresponding to (A2)], the concentration of which had been adjusted to 2 μmol/ml, were fed and, subsequently, 148.8 mg of the solid catalyst composition (B) obtained in the (1) was fed therein. While an ethylene gas was continuously supplied so as to maintain a total pressure at constant during polymerization, polymerization was performed 70° C. for 60 minutes.

Thereafter, butane, ethylene and hydrogen were purged to obtain 188 g of an ethylene-1-butene copolymer. After the resulting copolymer was kneaded with a roll (test roll Model HR-20F manufactured by Nisshin Chemical Industry, Co., Ltd.) so that all might become uniform, physical properties were assessed. The kneading conditions were a front roll temperature of 150° C., a back roll temperature of 160° C., a roll gap of 5 mm, and a kneading time was 5 minutes (after sample melting). Physical properties of the copolymer obtained by kneading are shown in Table 1.

Example 2

(1) Polymerization

Autoclave equipped with a stirrer having an internal volume of 3 l, which had been replaced with argon after drying under reduced pressure, was evacuated, hydrogen was added so that its partial pressure might become 0.005 MPa, 30 g of 1-butene, and 720 g of butane as a polymerization solvent were fed, and a temperature was raised to 70° C. Thereafter, ethylene was added so that its partial pressure might become 1.6 MPa, and the system was stabilized. As a result of gas chromatography analysis, a gas composition in the system was hydrogen=0.15 mol %, and 1-butene=1.57 mol %. Into this 0.9 ml of a hexane solution of isobutylaluminum as an organoaluminum compound (C), the concentration of which had been adjusted to 1 mol/l, was fed. Then, 1.5 ml of a toluene solution of dimethylsilanediylbis(cyclopentadienyl) zirconium dichloride [corresponding to component (A1)], the concentration of which had been adjusted to 10 μmol/ml, and 0.25 ml of a toluene solution of racemic-ethylenebis(1-indenyl)zirconium diphenoxide [corresponding to component (A2)], the concentration of which had been adjusted to 2 μmol/ml, were fed and, subsequently 156.6 mg of the solid catalyst component (B) obtained in Example 1 (1) was fed therein. While an ethylene gas was continuously supplied so as to maintain a total pressure at constant during polymerization, polymerization was performed at 70° C. for 60 minutes. Thereafter, butane, ethylene, and hydrogen were purged to obtain 278 g of an ethylene-1-butene copolymer. Polymerization activity per hour per gram of the solid catalyst component was 1780 g/g solid catalyst component·h. After the resulting copolymer was kneaded with a roll (test roll Model HR-20F manufactured by Nisshin Chemical Industry, Co., Ltd.) so that all might become uniform, physical properties were assessed. The kneading conditions were a front roll temperature of 150° C., a back roll temperature of 160° C., a roll gap of 5 mm, and a kneading time was 5 minutes (after sample melting). Physical properties of the copolymer obtained by kneading are shown in Table 1.

Comparative Example 1

(1) Polymerization

Autoclave equipped with a stirrer having an internal volume of 3 l, which had been replaced with argon after drying under reduced pressure, was evacuated, hydrogen was added so that its partial pressure might become 0.025 MPa, 55 g of 1-butene, and 695 g of butane as a polymerization solvent were fed, and a temperature was raised to 70° C. Thereafter, ethylene was added so that its partial pressure might become 1.6 MPa, and the system was stabilized. As a result of gas chromatography analysis, a gas composition in the system was hydrogen=1.10 mol %, and 1-butene=2.96 mol %. Into this 0.9 ml of a hexane solution of isobutylaluminum as an organoaluminum compound (C), the concentration of which had been adjusted to 1 mol/l, was fed. Then, 0.25 ml of a toluene solution of racemic-ethylenebis(1-indenyl)zirconium diphenoxide, the concentration of which had been adjusted to 2 μmol/ml, was fed therein and, subsequently, 3.4 mg of the solid catalyst component (B) obtained in Example 1 (1) was fed therein. While an ethylene/hydrogen mixed gas (hydrogen=0.32 mol %) was continuously supplied so as to maintain a total pressure during polymerization, and a hydrogen concentration in a gas at constant, polymerization was performed at 70° C. for 60 minutes. Thereafter, butane, ethylene, and hydrogen were purged to obtain 65 g of an ethylene-1-butene copolymer. Polymerization activity per hour per gram of the solid catalyst component was 19100 g/g solid catalyst component·h. After the resulting copolymer was kneaded with a roll (test roll Model HR-20F manufactured by Nisshin Chemical Industry, Co., Ltd.) so that all might become uniform, physical properties were assessed. The kneading conditions were a front roll temperature of 150° C., a back roll temperature of 160° C., a roll gap of 5 mm, and a kneading time was 5 minutes (after sample melting). Physical properties of the copolymer obtained by kneading are shown in Table 1.

TABLE 1

|  |  | Example 1 | Example 2 | Comparative Example 1 |
|---|---|---|---|---|
| Density | kg/m³ | 930 | 932 | 921 |
| MFR | g/10 min | 0.99 | 0.05 | 0.46 |
| SR | — | 1.13 | 1.10 | 1.32 |
| $N_{SCB}$ | 1/1000C | 10.6 | 8.7 | 15.7 |
| Molecular weight distribution Mw/Mn | — | 7.9 | 5.6 | 5.6 |
| MT | cN | 6.9 | 22.2 | — |
| g* | — | 0.69 | 0.64 | 0.78 |
| Impact strength |  | 150 | 145 | 163 |

INDUSTRIAL APPLICABILITY

According to the present invention, an ethylene-α-olefin copolymer superior in a balance between a melt tension, an extrusion load at extruding, and a mechanical strength, and an article obtained by extruding the copolymer can be provided.

The invention claimed is:

1. An ethylene-α-olefin copolymer comprising monomer units derived from ethylene and monomer units derived from an α-olefin having 3 to 20 carbon atoms, having a density (d) of 860 to 950 kg/m³, having a melt flow rate (MFR) of 0.1 to 100 g/10 min, having a ratio (Mw/Mn) of the weight average molecular weight (Mw) thereof to the number average molecular weight (Mn) thereof of 2 to 10, having a swell ratio (SR) of less than 1.35, and having a g* defined by the following formula (I) of 0.50 to 0.75, $$g^* = [\eta]/([\eta]_{GPC} \times g_{SCB}^*) \tag{I}$$

wherein [η] represents the intrinsic viscosity (unit: dl/g) of the ethylene-α-olefin copolymer, and is defined by the following formula (I-I), $[\eta]_{GPC}$ is defined by the following formula (I-II), and $g_{SCB}^*$ is defined by the following formula (I-III), $$[\eta] = 23.3 \times \log(\eta rel) \tag{I-I}$$

wherein ηrel represents the relative viscosity of the ethylene-α-olefin copolymer, $$[\eta]_{GPC} = 0.00046 \times Mv^{0.725} \tag{I-II}$$

wherein Mv represents the viscosity average molecular weight of the ethylene-α-olefin copolymer, $$g_{SCB}^* = (1-A)^{1.725} \tag{I-III}$$

wherein A can be determined from the measurement of the content of short chain branches in the ethylene-α-olefin copolymer.

2. An article produced by extruding the ethylene-α-olefin copolymer according to claim 1.

* * * * *